(12) United States Patent
Dalsgaard et al.

(10) Patent No.: US 8,571,091 B2
(45) Date of Patent: Oct. 29, 2013

(54) SYSTEM AND METHOD FOR EFFICIENT HALF DUPLEX TRANSCEIVER OPERATION IN A PACKET-BASED WIRELESS COMMUNICATION SYSTEM

(75) Inventors: Lars Dalsgaard, Oulu (FI); Frank Frederiksen, Klarup (DK); Troels Emil Kolding, Klarup (DK); Klaus Ingemann Pedersen, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 505 days.

(21) Appl. No.: 12/811,624

(22) PCT Filed: Jan. 4, 2008

(86) PCT No.: PCT/US2008/050231
§ 371 (c)(1),
(2), (4) Date: Jul. 16, 2010

(87) PCT Pub. No.: WO2009/088496
PCT Pub. Date: Jul. 16, 2009

(65) Prior Publication Data
US 2010/0290509 A1 Nov. 18, 2010

(51) Int. Cl.
*H04B 1/44* (2006.01)
*H04L 5/16* (2006.01)

(52) U.S. Cl.
USPC ............ 375/219; 375/259; 370/278; 370/282

(58) Field of Classification Search
USPC .......... 375/219, 220, 259, 260; 370/276–278, 370/280–282, 294–296
See application file for complete search history.

(56) References Cited

U.S. PATENT DOCUMENTS

2008/0159183 A1* 7/2008 Lindoff et al. ................ 370/278
2009/0135748 A1* 5/2009 Lindoff et al. ................ 370/296

OTHER PUBLICATIONS

ETSI TS 136 300 V8.3.0 (Jan. 2008), "Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.3.0 Release 8)", 124 pages.
TSG RAN WG1 R1-062369, "UE-specific idle period for half-duplex communications", Tallinn, Estonia, Aug. 27-Sep. 1, 2006, 10pages.

* cited by examiner

*Primary Examiner* — David B. Lugo
(74) *Attorney, Agent, or Firm* — Harrington & Smith

(57) ABSTRACT

Systems and methods for providing half duplex user equipment in a packet based radio frequency signaling communication system. User equipment with half duplex receiver and half duplex transmitter on IC providing a transceiver capability performs a cycle of receiving downlink messages for a predetermined number of sub frames, shifting to a transmit mode, transmitting uplink messages for the predetermined number of sub frames, shifting to a receive mode, and repeating the cycle of half duplex sub frames. A discontinuous reception function performs a DRX protocol wherein power is reduced to the transceiver for a period of time. A determination is made at the end of the discontinuous reception period to see if the half duplex cycle is at an uplink sub frame; if so, the end of the discontinuous reception is shifted by the user equipment to a downlink sub frame by adding a delay.

20 Claims, 15 Drawing Sheets

SYSTEM AND METHOD FOR EFFICIENT HALF DUPLEX TRANSCEIVER OPERATION IN A PACKET-BASED WIRELESS COMMUNICATION SYSTEM

TECHNICAL FIELD

The present invention is directed, in general, to communication systems and, more particularly, to a system and method for providing the use of half duplex user equipment or mobile transceiver devices in a packet based communication system that includes discontinuous reception, VoIP packet support and full duplex FDD devices while allowing for efficient use, simple implementation and conservation of system resources.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications. The improvements are being made to cope with continuing new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. The project envisions a packet switched communications environment with support for such services as VoIP ("Voice over Internet Protocol") and Multimedia Broadcast/Multicast Services ("MBMS"). MBMS may support services where base stations transmit to multiple user equipment simultaneously such as mobile television or radio broadcasts, for example. The 3GPP LTE project is not itself a standard-generating effort, but will result in new recommendations for standards for the UMTS.

The UTRAN includes multiple Radio Network Subsystems (RNSs), each of which contains at least one Radio Network Controller (RNC). However, it should be noted that the RNC may not be present in the actual implemented systems incorporating Long Term Evolution (LTE) of UTRAN (E-UTRAN). LTE may include a centralized or decentralized entity for control information. In UTRAN operation, each RNC may be connected to multiple Node Bs which are the UMTS counterparts to Global System for Mobile Communications (GSM) base stations. In E-UTRAN systems, the e-Node B may be, or is, connected directly to the access gateway ("aGW," sometimes referred to as the services gateway "sGW"). Each Node B may be in radio contact with multiple UEs (generally, user equipment including mobile transceivers or cellphones, although other devices such as fixed cellular phones, mobile web browsers, laptops, PDAs, MP3 players, gaming devices with transceivers may also be UEs) via the radio Uu interface.

The wireless communication systems as described herein are applicable to, for instance, 3GPP LTE compatible wireless communication systems and of interest is an aspect of LTE referred to as "evolved UMTS Terrestrial Radio Access Network," or E-UTRAN. In general, E-UTRAN resources are assigned more or less temporarily by the network to one or more UEs by use of allocation tables, or more generally by use of a downlink resource assignment channel or physical downlink control channel (PDCCH). LTE is a packet-based system and, therefore, there may not be a dedicated connection reserved for communication between a UE and the network. Users are generally scheduled on a shared channel every transmission time interval (TTI) by a Node B or an evolved Node B (e-Node B). A Node B or an e-Node B controls the communications between user equipment terminals in a cell served by the Node B or e-Node B. In general, one Node B or e-Node B serves each cell. A Node B may be referred to as a "base station." Resources needed for data transfer are assigned either as one time assignments or in a persistent/semi-static way. The LTE, also referred to as 3.9G, generally supports a large number of users per cell with quasi-instantaneous access to radio resources in the active state. It is a design requirement that at least 200 users per cell should be supported in the active state for spectrum allocations up to 5 megahertz (MHz), and at least 400 users for a higher spectrum allocation.

In order to facilitate scheduling on the shared channel, the e-Node B transmits a resource allocation to a particular UE in a downlink-shared channel (PDCCH) to the UE. The allocation information may be related to both uplink and downlink channels. The allocation information may include information about which resource blocks in the frequency domain are allocated to the scheduled user(s), the modulation and coding schemes to use, what the size of the transport block is, and the like.

One service supported by E-UTRAN UEs and E-Node Bs is discontinuous reception ("DRX"). In discontinuous reception, the UE is arranged to conserve its power consumption (typically, the UE is battery powered and the battery life is a critical aspect of the convenience of the equipment). The UE enters (or may be instructed to enter by the e-Node B) a DRX sleep or standby period for a determined period and at the end of the period, the UE checks the DL channel to determine if resources are allocated to the UE in the present sub frame. If no resources are allocated the UE may again enter a DRX standby cycle. During standby cycles as much of the receiver and transmitter circuitry in the UE as possible is powered down to conserve battery power. The e-Node B is arranged to be aware of the operation of the UEs that are connected to it and is aware that they are performing DRX.

The lowest level of communication in the e-UTRAN system, Level 1, is implemented by the Physical Layer ("PHY") in the UE and in the e-Node B and the PHY performs the physical transport of the packets between them over the air interface using radio frequency signals. In order to ensure a transmitted packet was received, an automatic retransmit request ("ARQ") and a hybrid automatic retransmit request ("HARQ") approach is provided. Thus whenever the UE receives packets through one of several downlink channels, including command channels and shared channels, the UE performs a communications error check on the received packets, typically a Cyclic Redundancy Check (CRC), and in a later sub frame following the reception of the packets, transmits a response on the uplink to the e-Node B or base station. The response is either an Acknowledge (ACK) or a Not Acknowledged (NACK) message. If the response is an NACK, the e-Node B automatically retransmits the packets in a later sub frame on the downlink or DL. In the same manner, any UL transmission from the UE to the e-Node B is responded to, at a specific sub frame later in time, by a NACK/ACK message on the DL channel to complete the HARQ. In this manner, the packet communications system remains robust with a low latency time and fast turnaround time.

The types of UEs the e-UTRAN environment can accommodate are many. One type of UE that is presently proposed to be supported in e-UTRAN systems is a half duplex FDD UE. This type of UE can only receive (be in downlink mode) or transmit (be in uplink mode) at a particular time but cannot be in both modes simultaneously, unlike a full duplex UE. The half duplex UEs proposed will also have DRX services. The need to accommodate a half duplex UE in the environment poses several problems for the system. A need thus exists for methods and apparatus to support half duplex UEs in the e-UTRAN environment. The addition of support for half duplex UEs must have a minimum impact on the efficiency and operation of the remaining services in the environment, the other UEs, the e-Node B devices, and mobile management entities ("MMEs").

SUMMARY OF THE INVENTION

These and other problems are generally solved or circumvented, and technical advantages are generally achieved, by advantageous embodiments of the present invention which include an apparatus and methods according to an embodiment for providing a half duplex UE supporting the DRX services.

According to an illustrative embodiment, a communication terminal such as a UE is provided that may implement a half duplex transceiver cycle of downlink and uplink sub frames of a duplex window length separated in each direction by a number of shift sub frames. The communication terminal may also include DRX having a cycle independent of the half duplex cycle.

According to another embodiment, a communication terminal such as a UE is provided that may include means for determining, at the end of a DRX standby or sleep mode, whether the half duplex cycle sub frame at the present time is a UL sub frame in the half duplex cycle. According to another embodiment, if the sub frame at the time of the end of a DRX cycle is a UL or shift sub frame in the half duplex cycle, the UE may delay the DRX to a DL sub frame in the half duplex cycle.

According to yet another embodiment, a communication system is provided that may include a half duplex UE that may be configured to conserve energy in its power source by, for example, employing DRX, and a network component such as a base station (e.g., a node B or an e-node B) that may be configured to transmit PDCCH messages to the UE allocating resources.

According to another embodiment, a system is provided including full duplex UE devices connected to an e-Node B base station device over an air interface and at least one half duplex UE connected to the same e-Node B base station device over the air interface, the half duplex and full duplex UEs performing a discontinuous reception mode.

According to another embodiment, the half duplex UE may perform a half duplex cycle of receiving downlink messages during a downlink window of a predetermined number of sub frames, shifting to a transmit mode during a sub frame, perform a half duplex cycle of transmitting uplink messages during an uplink window of the predetermined number of sub frames and shifting to a receive mode during a sub frame, and then repeating the cycle of receiving downlink messages, shifting to a transmit mode, transmitting uplink messages, and shifting to a receive mode.

According to another embodiment, the half duplex UE may enter a discontinuous reception mode while maintaining the half duplex cycle. According to another embodiment, the half duplex UE may detect the end of the discontinuous reception mode, determine whether at the present time the sub frame in the half duplex cycle is an uplink sub frame, and selectively shift the DRX cycle to a downlink sub frame in the half duplex cycle, responsive to the determination.

According to a preferred method, packets are selectively received in a half duplex transceiver from a downlink channel for a predetermined number of sub frames; a shift is made to a transmit mode; half duplex packets are selectively transmitted on an uplink channel for a predetermined number of sub frames, a shift is made to a receive mode, and a repeating cycle of the above steps is performed. In another preferred method, a discontinuous reception mode is performed, and at the end of the discontinuous reception mode, a determination is made to determine whether the present sub frame is an uplink sub frame. In another illustrative method, if the discontinuous reception mode ends in an uplink sub frame, the discontinuous reception mode is extended to a downlink sub frame.

In another illustrative embodiment, an apparatus is provided comprising a half duplex receiver for selectively receiving radio frequency downlink signals on a downlink (DL) during a number of DL sub frames M; a half duplex transmitter for selectively transmitting radio frequency uplink signals on an uplink (UL) during N UL sub frames; a discontinuous reception (DRX) function periodically reducing power to the half duplex receiver and half duplex transmitter for a predetermined number of DRX sub frames; a half duplex cycle function performing a predetermined half duplex cycle in the half duplex receiver and in the half duplex transmitter selectively receiving a number of sub frames M from the DL, shifting to a transmit mode, selectively transmitting a number of sub frames N on the UL, shifting to a receive mode, and continuously repeating the receiving, shifting to a transmit mode, transmitting and shifting to a receive mode; a DRX delay function for determining at the end of the DRX sub frames, if the half duplex receiver is presently receiving DL sub frames; and a DRX extender function coupled to the DRX delay function and when determining the receiver is not presently receiving DL sub frames, extending the DRX sub frames by a predetermined number of sub frames until the receiver is receiving DL sub frames.

In another illustrative embodiment a system is provided comprising one or more base stations for sending and receiving radio frequency signals; one or more full duplex user equipment radio frequency transceivers selectively connected to at least one of the base stations; at least one half duplex user equipment radio frequency transceiver selectively connected to at least one of the base stations, each half duplex user equipment radio frequency transceiver further comprising a half duplex receiver for selectively receiving radio frequency downlink signals on a downlink (DL) during a number of DL sub frames M; a half duplex transmitter for selectively transmitting radio frequency uplink signals on an uplink (UL) during N UL sub frames; a discontinuous reception (DRX) function periodically reducing power to the half duplex receiver and half duplex transmitter for a predetermined number of DRX sub frames; a half duplex cycle function performing a predetermined half duplex cycle in the half duplex receiver and in the half duplex transmitter selectively receiving a number of sub frames M from the DL, shifting to a transmit mode, selectively transmitting a number of sub frames N on the UL, shifting to a receive mode, and continuously repeating the receiving, shifting to a transmit mode, transmitting and shifting to a receive mode; a DRX delay function for determining at the end of the DRX sub frames, if the half duplex receiver is presently receiving DL sub frames; and a DRX extender function coupled to the DRX delay function and when determining the receiver is not presently receiving DL sub frames, extending the DRX sub frames by a predetermined number of sub frames until the receiver is receiving DL sub frames.

In another illustrative method a half duplex radio frequency receiver for receiving downlink (DL) signals in M DL sub frames and a half duplex radio frequency transmitter for transmitting uplink (UL) signals in N UL sub frames are provided; a discontinuous reception (DRX) state is entered, the half duplex receiver and half duplex transmitter being inactive for a number of DRX sub frames; the end of a number of DRX sub frames is determined; an evaluation is made determining whether in a predetermined, repeating half duplex cycle of M DL sub frames, a shift sub frame, UL sub frames and a shift sub frame, the present sub frame is a DL sub frame; and responsive to the evaluating, a PDCCH signal is received during a DL sub frame.

In another illustrative embodiment, an apparatus is provided comprising an integrated circuit having a terminal for receiving power; a half duplex receiver for selectively receiving radio frequency downlink signals on a downlink (DL) during a number of DL sub frames M; a half duplex transmitter for selectively transmitting radio frequency uplink signals on an uplink (UL) during N UL sub frames; a half duplex cycle function performing a predetermined half duplex cycle in the half duplex receiver and in the half duplex transmitter selectively receiving a number of sub frames M from the DL, shifting to a transmit mode, selectively transmitting a number of sub frames N on the UL, shifting to a receive mode, and continuously repeating the receiving, shifting to a transmit mode, transmitting and shifting to a receive mode; a discontinuous reception (DRX) function periodically reducing power to the half duplex receiver and half duplex transmitter for a predetermined number of DRX sub frames; a DRX delay function for determining at the end of the DRX sub frames, if the half duplex receiver is presently receiving DL sub frames; and a DRX extender function coupled to the DRX delay function and when determining the receiver is not presently receiving DL sub frames, extending the DRX sub frames by a predetermined number of sub frames until the receiver is receiving DL sub frames.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION

Figure 1:
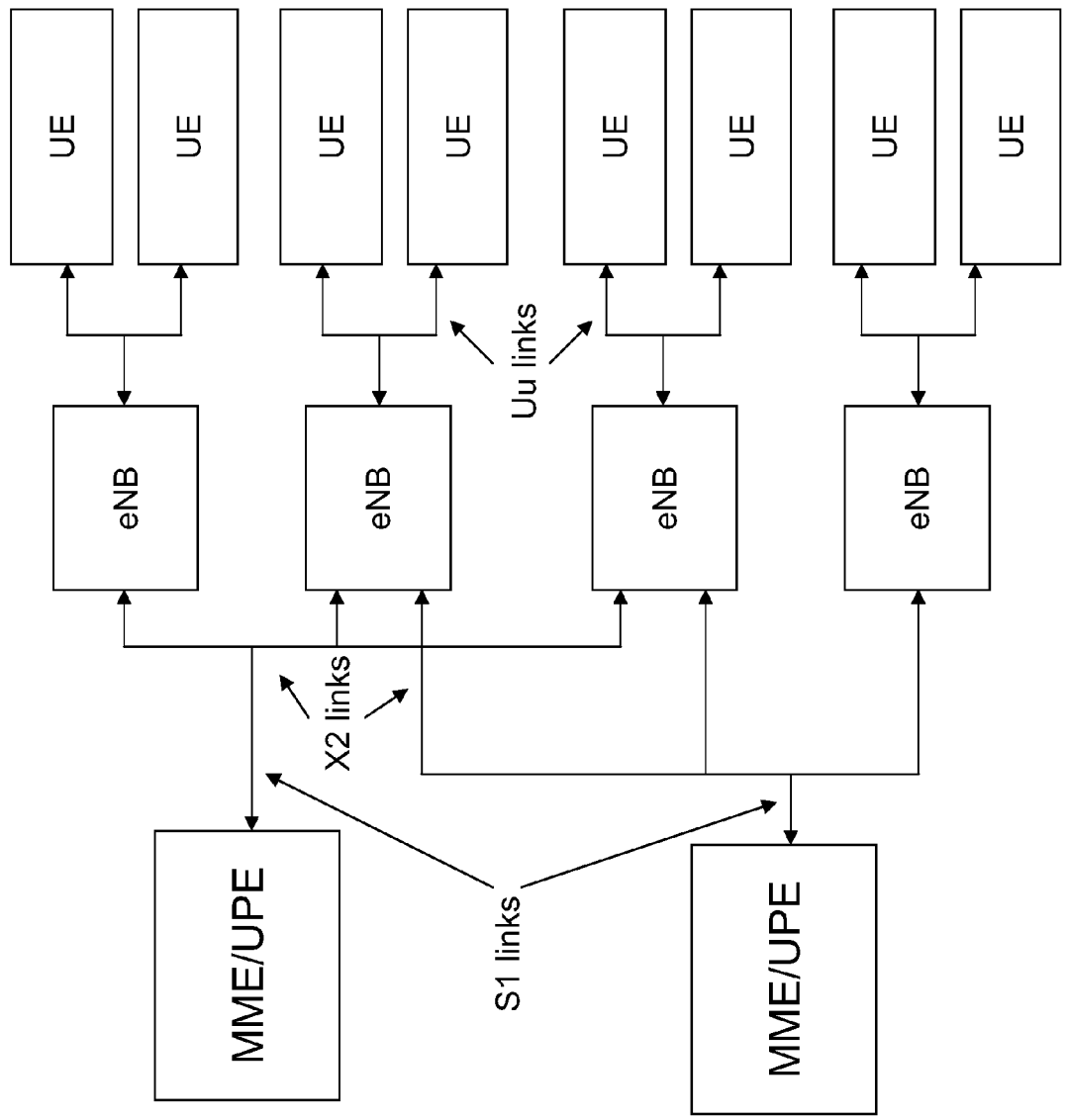
FIG. 1 illustrates a communications system according to an advantageous embodiment of the invention.

Referring initially to FIG. 1, illustrated is a system level diagram of a radio frequency interface communication system including a wireless communication system that provides an environment for the application of the principles of the present invention. The wireless communication system may be configured to provide features included in the evolved UMTS terrestrial radio access network ("e-UTRAN") universal mobile telecommunications services. Mobile management entities ("MMEs") and user plane entities ("UPEs") provide control functionality for one or more e-UTRAN node B (designated "eNB," an "evolved node B," also commonly referred to as a "base station") via an S1 interface or communication link. The base stations communicate via an X2 interface or communication link. The various communication links are typically fiber, microwave, or other high-frequency metallic communication paths such as coaxial links, or combinations thereof.

The base stations communicate over an air interface with user equipment (designated "UE"), which is typically a mobile transceiver carried by a user. Alternatively the user equipment may be a mobile web browser, text messaging appliance, a laptop with a mobile PC modem, or other user device configured for cellular or mobile services. Thus, communication links (designated "Uu" communication links)

coupling the base stations to the user equipment are air links employing a wireless communication signal. For example the devices may communicate using a known signaling approach such as a 1.8 GHz orthogonal frequency division multiplex ("OFDM") signal. Other radio frequency signals may be used.

Figure 2:
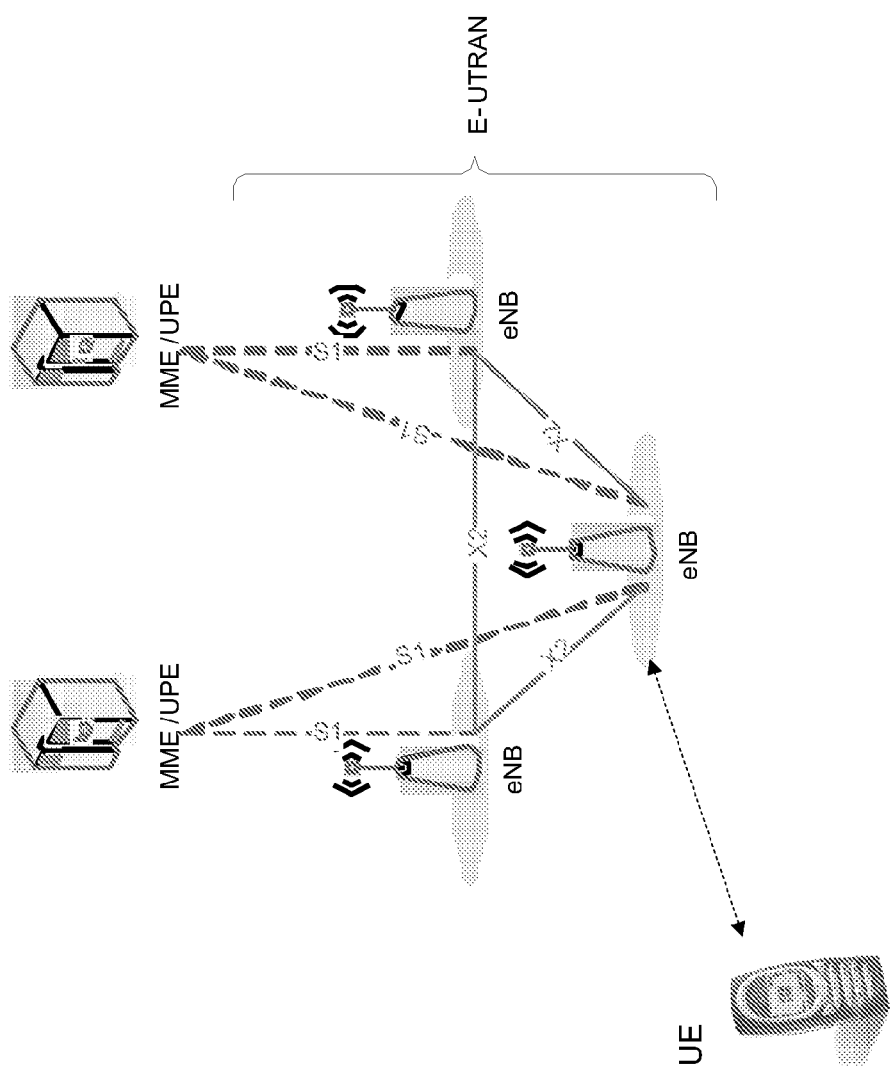
FIG. 2 illustrates user equipment communicating to an e-Node B over an air interface, and an e-UTRAN communications system according to an advantageous embodiment of the invention.

FIG. 2 illustrates in a system level diagram a communication system including a wireless communication system that provides an environment for the application of the principles of the present invention. The wireless communication system provides an e-UTRAN architecture including base stations (designated in the LTE 3GPP nomenclature as e-Node B or "eNBs") providing e-UTRAN user plane (packet data convergence protocol/radio link control/media access control/physical transport) and control plane (radio resource control) protocol terminations directed towards user equipment (designated as "UE"). The base stations are interconnected with an X2 interface or communication link. The base stations are also connected by an S1 interface or communication link to an evolved packet core ("EPC") including, for instance, a mobility management entity ("MME") and a user plane entity ("UPE"), which may form an access gateway ("aGW," a system architecture evolution gateway). The S1 interface supports a multiple entity relationship between the mobility management entities/user plane entities and the base stations and supports a functional split between the mobility management entities and the user plane entities.

The base stations may host functions such as radio resource management (e.g., internet protocol ("IP"), header compression and encryption of user data streams, ciphering of user data streams, radio bearer control, radio admission control, connection mobility control, dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity may host functions such as distribution of paging messages to the base stations, security control, terminating U-plane packets for paging reasons, switching of U-plane for support of the user equipment mobility, idle state mobility control, and system architecture evolution bearer control. The user equipment receives an allocation of a group of information blocks from the base stations.

Figure 3:
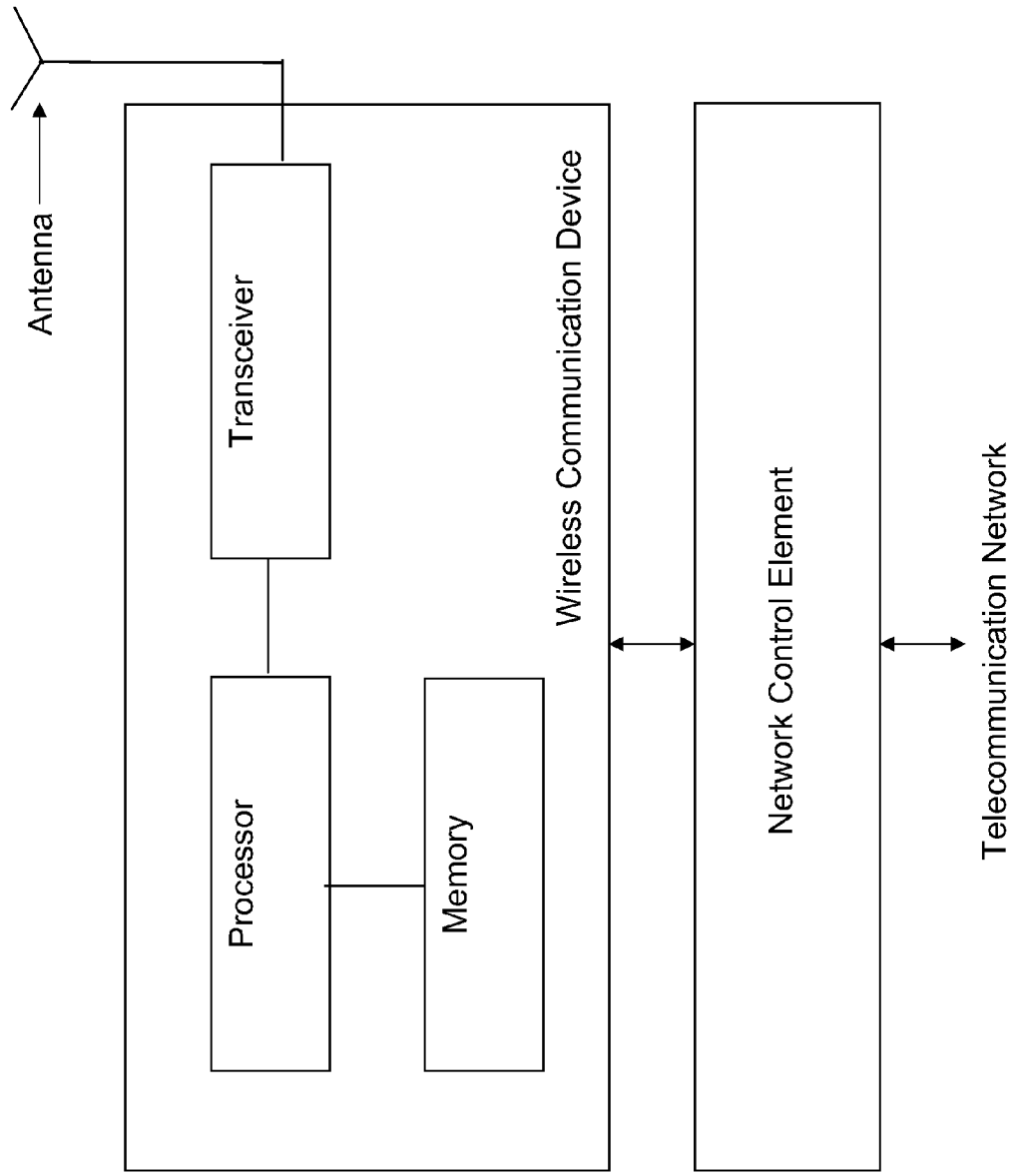
FIG. 3 illustrates a block diagram of a communication terminal according to an advantageous embodiment of the invention.

FIG. 3 illustrates a simplified system level diagram of an example communication element of a communication system that provides an environment and structure for application of the principles of the present invention. The communication element may represent, without limitation, an apparatus including a base station, user equipment, such as a terminal or mobile station, a network control element, or the like. The communication element includes, at least, a processor, memory that stores programs and data of a temporary or more permanent nature, an antenna, and a radio frequency transceiver coupled to the antenna and the processor for bidirectional wireless communication. Other functions may also be provided. The communication element may provide point-to-point and/or point-to-multipoint communication services.

The communication element, such as a base station in a cellular network, may be coupled to a communication network element, such as a network control element of a public switched telecommunication network. The network control element may, in turn, be formed with a processor, memory, and other electronic elements (not shown). The network control element generally provides access to a telecommunication network such as a public switched telecommunication network ("PSTN"). Access may be provided using fiber optic, coaxial, twisted pair, microwave communication, or similar communication links coupled to an appropriate link-terminating element. A communication element formed as a mobile station is generally a self-contained device intended to be carried by an end user; however in areas where wired services are not available the mobile station may be permanently installed at a fixed location as well.

The processor in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element may be of any type suitable to the local application environment, and may include one or more of general-purpose computers, special-purpose computers, microprocessors, digital signal processors ("DSPs"), and processors based on a multi-core processor architecture, as non-limiting examples.

The transceiver of the communication element modulates information onto a carrier waveform for transmission by the communication element via the antenna to another communication element. The transceiver demodulates information received via the antenna for further processing by other communication elements.

The memory of the communication element, as introduced above, may be of any type suitable to the local application environment, and may be implemented using any suitable volatile or nonvolatile data storage technology, such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above.

Figure 4:
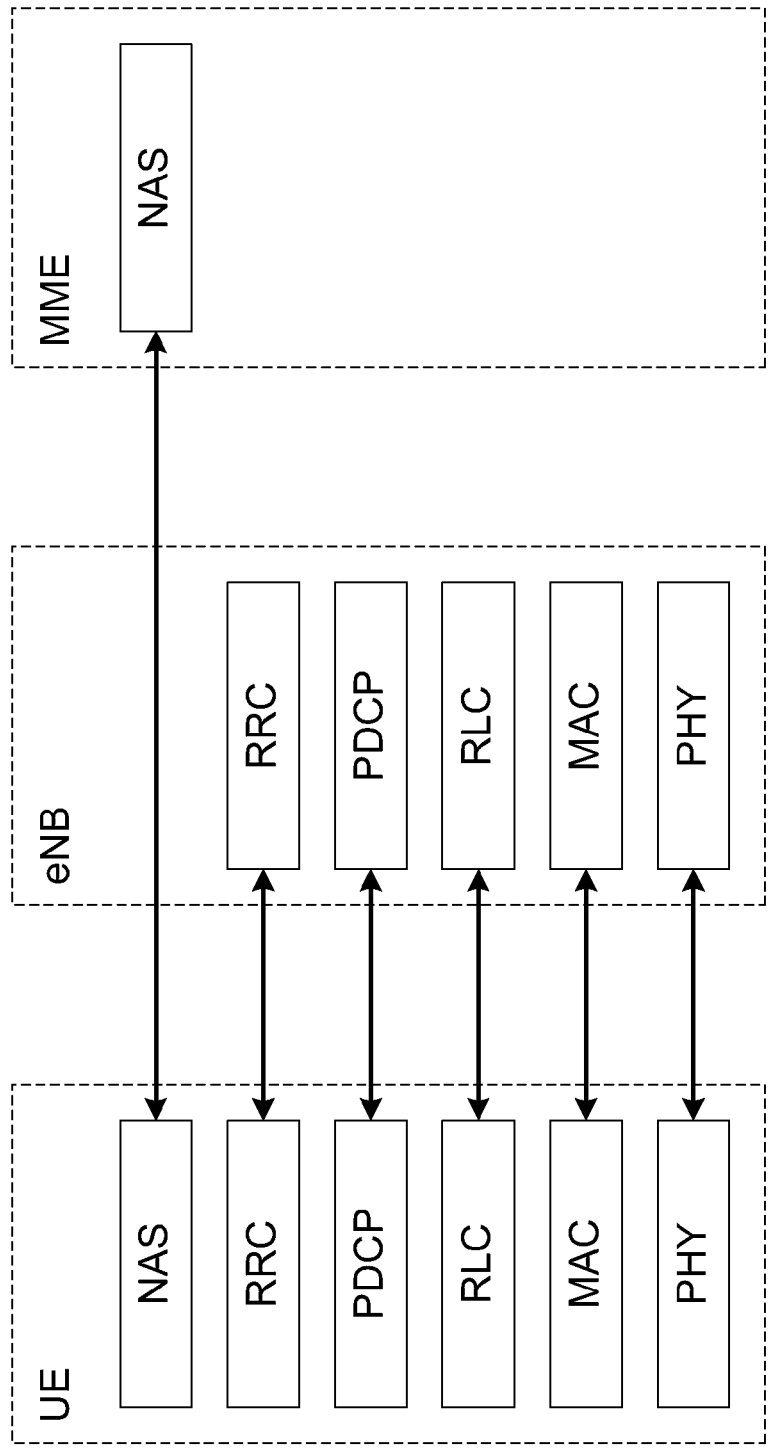
FIG. 4 illustrates communication layers of a UE, eNB and MME according to an advantageous embodiment of the invention.

FIG. 4 depicts a block diagram of an embodiment of user equipment and a base station constructed according to the principles of the present invention. The user equipment UE and the base station each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment and the mobile management entity ("MME") include a non-access stratum ("NAS") subsystem.

The physical layer subsystem supports the physical transport of packets over the LTE air interface and provides, as non-limiting examples, cyclic redundancy check ("CRC") insertion (e.g., a 24 bit CRC is a baseline for physical downlink shared channel ("PDSCH"), channel coding (e.g., turbo coding based on QPP inner interleaving with trellis termination), physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("QAM") and 64 QAM, layer mapping and pre-coding, and mapping to assigned resources and antenna ports. The media access layer or MAC performs the HARQ functionality and other important functions between the logical transport layer, or Level 2, and the physical transport layer, or Level 1.

Each layer is implemented in the system and may be implemented in a variety of ways. A layer such as the PHY in the UE may be implemented using hardware, software, programmable hardware, firmware, or a combination of these as is known in the art. Programmable devices such as DSPs, RISC, CISC, microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

Figure 5:
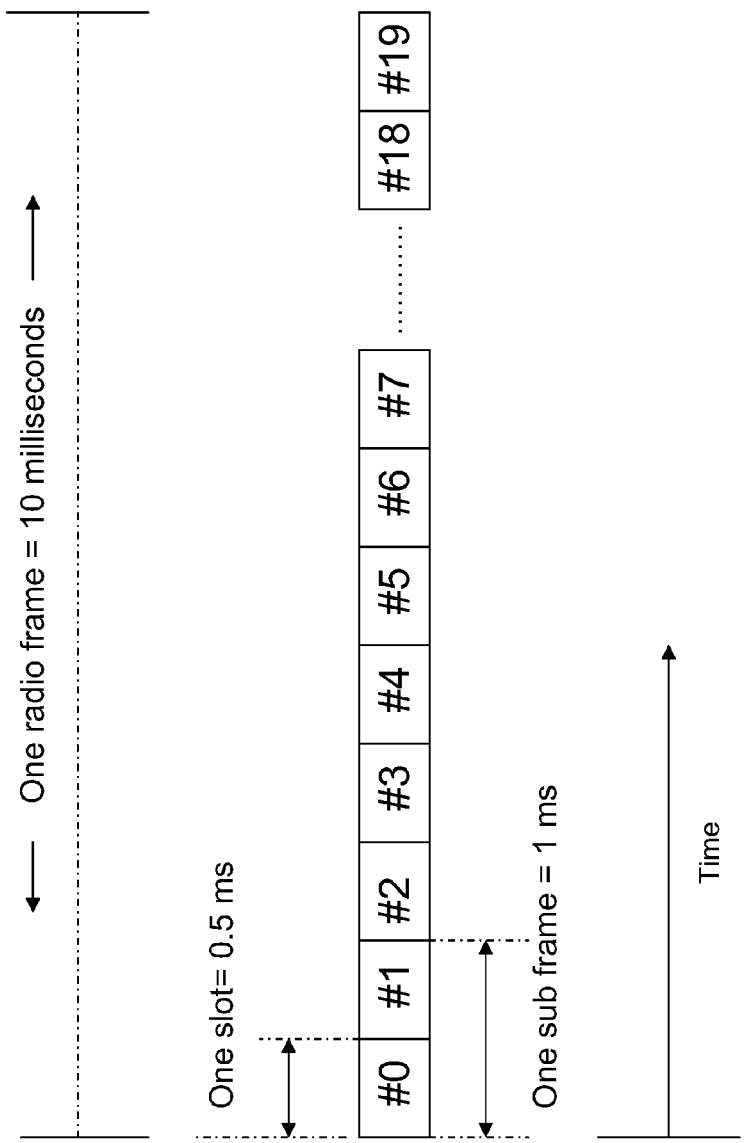
FIG. 5 illustrates a generic radio frame for an air interface communications scheme that may be used to implement an advantageous embodiment of the invention.

FIG. 5 depicts, in very simple form, the generic transport frame used in the e-UTRAN system to physically communicate packets to and from, for example, a Node B or e-Node B device and one or more UE devices over the air interface. A radio frame in the system is presently defined as having a length $T_s$ of 10 milliseconds. The radio frame is further subdivided into 10 sub frames, each having a length $T_s$ of 1 millisecond. Each sub frame is further divided again into two slots; each slot has a length of 0.5 milliseconds as shown.

Figure 6:
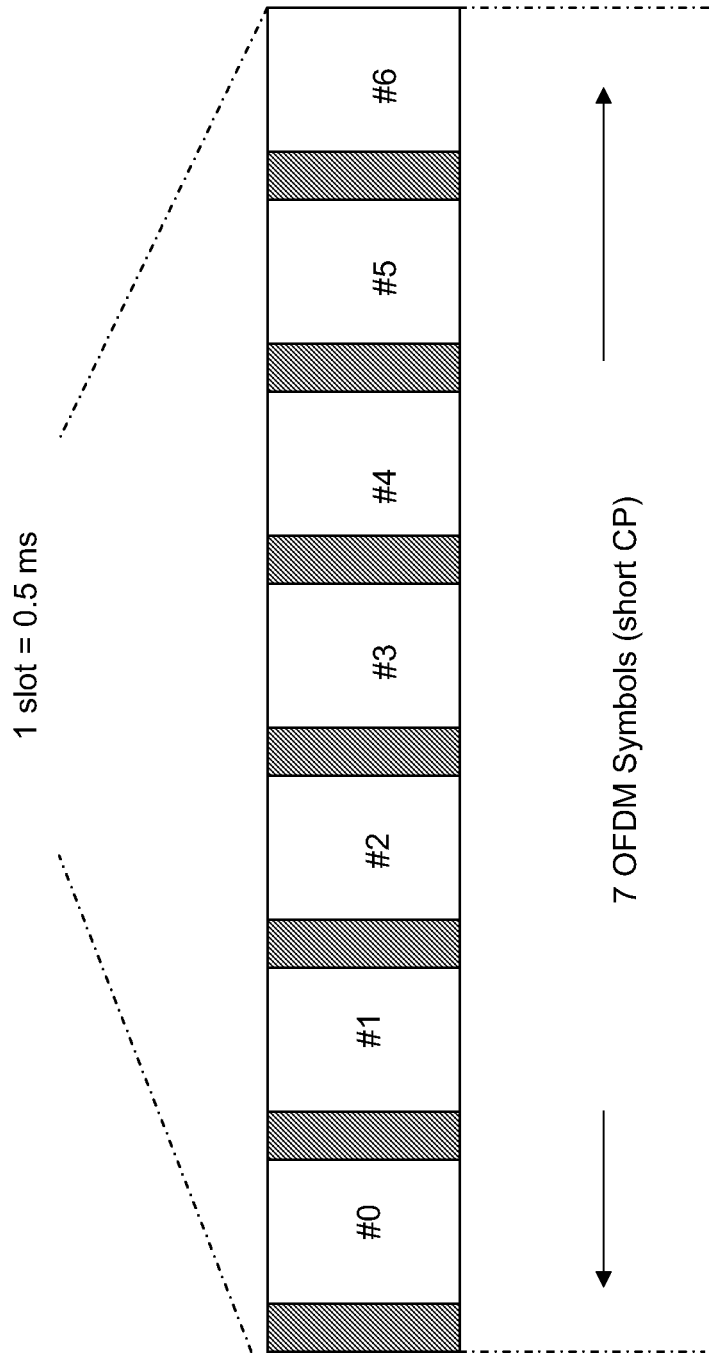
FIG. 6 illustrates symbols carried within a slot of the frame of FIG. 5 that may be used to implement an advantageous embodiment of the invention.

FIG. 6 depicts a sub frame in the case of a normal or short cyclic prefix (CP) illustrative example. The cyclic prefix (depicted shaded in FIG. 6) acts as a guard band between symbols. Each sub frame can communicate a number of symbols. Symbols are therefore divided by a guard period which advantageously prevents or reduces inter-symbol interference (ISI). The number of symbols available is presently defined as either 6, or 7, per 0.5 millisecond sub frame, depending on the length of the cyclic prefix ("CP") that is utilized. As depicted in FIG. 6, for a normal length CP, a slot in a sub frame may transport 7 symbols; each symbol in the downlink case is an orthogonal frequency duplex multiplexed symbol (OFDM). Another format that is contemplated for the slot is a longer time length CP, with 6 symbols. The length of the cyclic prefix is important in reducing or eliminating inter-symbol interference (ISI). The elimination of ISI is a particular advantage obtained by using OFDM as the transport scheme. Because OFDM is an orthogonal signaling structure, inter-carrier interference (ICI) is also eliminated or greatly reduced compared to earlier systems.

The e-UTRAN system architecture has several significant features that impact timing in the system. A transmission time interval ("TTI") is defined and users (e.g. UE or mobile transceivers) are scheduled on a shared channel every transmission time interval. The majority of UE or mobile transceivers considered in the implementation of the e-UTRAN are full duplex devices or FDD. These UEs can therefore receive control and data allocations and packets from the e-NODE B or base station they are connected to in any sub frame interval in which they are active. The UE detects when resources are allocated to it in the allocation messages on the physical downlink control channel (PDCCH). When resources are allocated to a UE, the UE can determine that data or other packets are going to be transmitted towards it in the present frame or coming frames. Also, the UE may have uplink resources allocated to it. In this case the UE will be expected to transmit towards the e-Node B in coming frames on the uplink based on the allocated UL resources. Additionally, the UE will be transmitting the messages that provide the HARQ support, e.g. ACK/NACK, towards the e-Node B on the uplink or UL in coming frames. Further, the UE must be prepared to receive synchronous HARQ NACK/ACK signals from the e-Node B on the DL in response to the UL signals it transmits towards the e-Node B. The HARQ ACK/NACK on the DL is synchronous and will therefore be transmitted from the e-Node B at a specific coming sub frame after a transmission from the UE on the UL.

A full duplex FDD UE has significant hardware and software resources allocated to duplex filtering. This expensive filtering is necessary so that the radio transceiver operates properly. The receiver in the UE device will receive not only DL traffic directed towards the device, but also handle its own UL traffic being transmitted at the same point in time (and of course also UL traffic from other devices). However, the simultaneous transmitted UL traffic will be received at high signal strength at the same UE and has to be removed from the received radio signals by duplex filtering. In the presently proposed e-UTRAN system the UL air interface is to be a SC-FDMA system that is a single channel FDMA interface, with a relatively low peak to average power ratio which helps conserve battery power in the mobile transceivers. In contrast, the downlink or DL air interface is an orthogonal FDMA or OFDM signal. The base stations, or e-Node Bs, are not battery operated in a typical application and thus the advantages of the OFDM signaling outweigh the somewhat increased peak to average power ratio and the power requirements of the signaling in the DL.

Because the UEs are typically mobile devices using rechargeable batteries, battery life must be maintained and/or extended as much as possible. In order to make as few transmissions from the UE as possible, and to allow the UE to enter a sleep mode or standby mode as often as possible, discontinuous reception service (DRX) is provided. DRX is supported by having a connected UE device power up, at predetermined times and periodically, at least its receiver portion of the radio transceiver circuitry to listen to the downlink messages on the DL channel PDCCH. The UE then determines whether any downlink allocations were made for it and whether any uplink allocations were made for it (that is, the UE decodes the allocation information in the PDCCH and determines whether it is addressed and required to take action, such as receiving packets in the present or a later sub frame, or whether it is required to respond with a transmitted packet in a later sub frame).

A minimum "on duration" time may be established for each time the UE comes to the end of a DRX standby or sleep period. The "on duration" time may extend over several sub frames to increase the likelihood the UE will be receiving and active (sometimes referred to as "listening") when a PDCCH packet is arriving. If the UE determines in monitoring the PDCCH channel that resources have in fact been allocated to it and that thus there is a need to stay active, it will remain active for some period of time. The time before the UE goes back to a sleep or standby mode as part of the DRX service is set by an "inactivity timer." The inactivity timer may cause the UE to stay active throughout an entire DRX period, depending on system settings and protocols. These settings and protocols may be, for a non-limiting example, provided by the e-Node B, probably by the radio resource manager ("RRM") functionality. These settings and protocols could be implemented in other entities in the system as well. These settings may be fixed or may be changed dynamically to increase the efficiency of the system. Ideally the UE will quickly receive a PDCCH that allocates DL or UL resources to it, but will also remain inactive whenever possible to preserve battery life.

Figure 7:
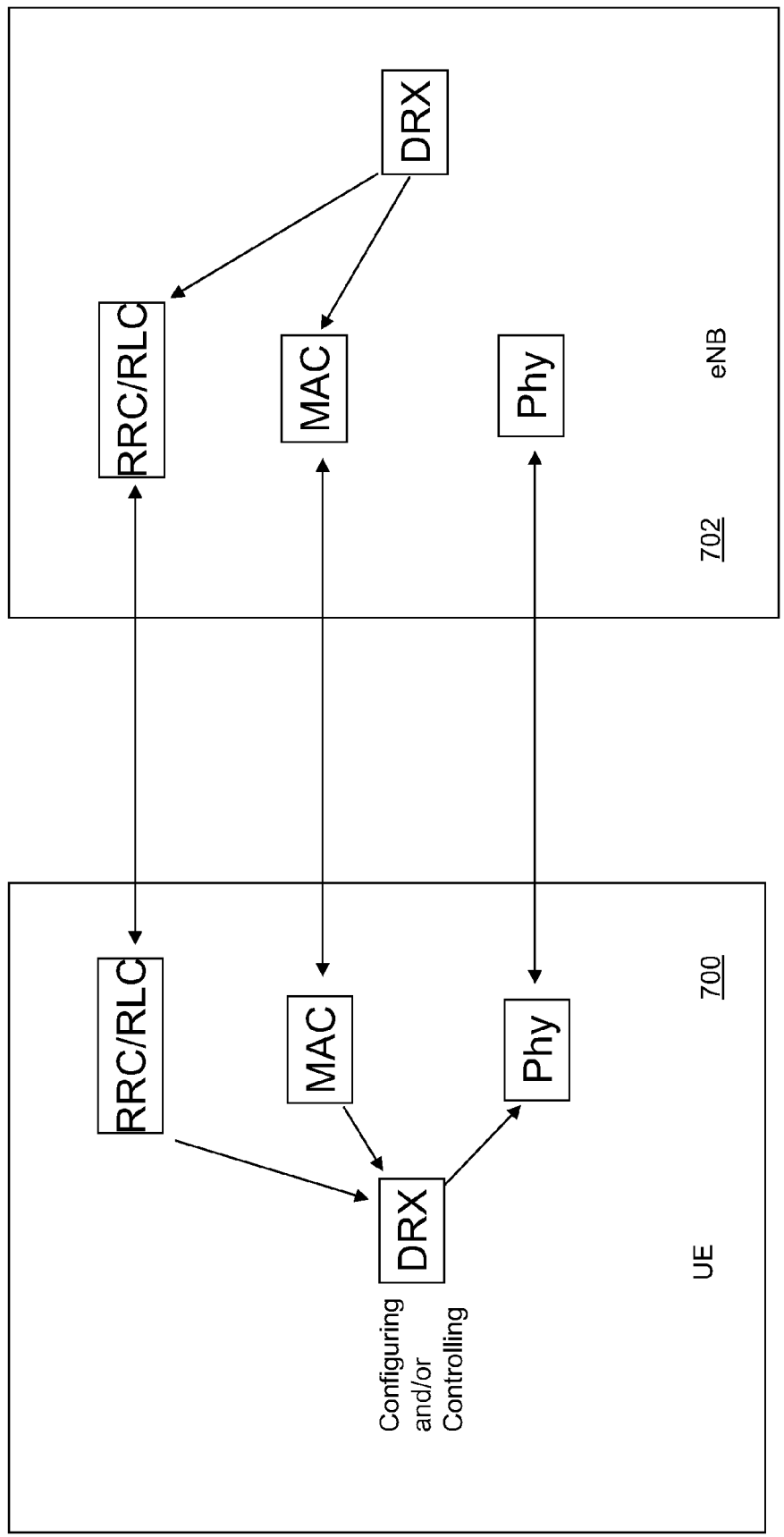
FIG. 7 illustrates the discontinuous reception (DRX) services in a UE and an eNB constructed according to an advantageous embodiment of the invention.

FIG. 7 depicts in a simplified view a pair of devices connected and in communication over the air interface in an example LTE system. In FIG. 7, UE 700 has layers RRC/RLC, MAC and PHY operating. The base station or eNB 702 likewise had these layers operating. Both the UE and the eNB have a DRX process operating. The DRX cycle thus is a cooperative, understood service protocol that is utilized to reduce the power the UE consumes between resource allocations, while efficiently enabling the UE to quickly detect PDCCH messages that allocate resources to it without wasting cycles (keeping system latency low). Both the UE and the e-Node B understand and cooperatively implement DRX. (A single e-Node B will typically be connected to many other UEs simultaneously, and many of these may be full duplex UEs or half duplex UEs as contemplated in the illustrative embodiments.)

One method of managing these services with a minimum of resources required on the base station 702 is to define timers to be provided in either software or hardware within the UE. DRX timing processes indicate when the UE should next transition to an active reception mode and monitor the PDCCH channel (in the DL). The UE does this in order to determine if the base station has presently allocated resources for that particular UE. While a PDCCH signal is present each sub frame on the DL, there may or may not be any resource allocations for the UE in the PDCCH.

A minimum "on duration" time determines for how many sub frames the UE remains active after becoming active at the end of a DRX cycle. While active, the UE continues checking for resource allocations on the PDCCH addressed to the UE. Thus if there are no resource allocations for the UE present in the PDCCH in the first active sub frame after a DRX sleep or standby period ends, the UE may detect resource allocations addressed for it in the PDCCH in the next sub frame (assuming an on duration of 2 sub frames, which corresponds in time to 2 milliseconds). The on duration time may be set to extend the active period longer, by increasing it to 3 or 4 sub frames, again corresponding to milliseconds. The system trade off in setting these times is power consumed in remaining active sub frames vs. the likelihood a PDCCH message will be detected in the next few sub frames. A shorter "on duration" will enable the UE to rapidly return to an inactive state. A longer "on duration" will cause the UE to remain active and "listening" for more sub frames and thus increase the rapid detection and response to a PDCCH that allocates resources to the UE.

The second DRX UE timer is an "inactivity" timer, which in general is set when the UE is in a state known as the RRC-CONNECTED mode. The RRC_CONNECTED mode is active when the UE is connected to an e-Node B. If the UE detects an appropriate PDCCH on the DL that allocates resources to the UE (i.e. the UE is addressed in the PDCCH), the inactivity timer determines how long the UE remains active (i.e. decodes or monitors PDCCH for possible resource allocation, i.e. UE being addressed in the PDCCH) before entering the DRX mode again. Each time the UE decodes another PDCCH on the DL that allocates resources to that UE, the inactivity timer is restarted. The inactivity timer is decremented for each sub frame that the UE remains active until it reaches an endpoint, e.g. zero, indicating the UE is inactive and may again enter a DRX standby or sleep cycle.

By setting these timers appropriately, the e-Node B or base station can efficiently manage the many UEs connected to it or present in the cell at any particular point in time. The e-Node B RRM can change these parameters and the quality of service ("QoS") can be maintained throughout the system by providing these flexible resources. A less desirable, although workable, embodiment would provide fixed times for these timers that are known to the system.

Additional timing related services are present in the environment. The e-UTRAN communications environment supports VoIP communication. The use of VoIP packets creates another cyclic pattern within the system. A typical cycle for VoIP would be 20 milliseconds although 40 milliseconds, 60 milliseconds and 80 milliseconds may also be used in case packet bundling is used. 20 milliseconds will be used as a non-limiting default example for VoIP packets throughout the rest of this specification text. Further, the e-UTRAN communications system provides automatic retransmission request (ARQ) and hybrid automatic retransmission request (HARQ) support. The HARQ is supported by the UE and this support has two different dimensions. In the downlink direction, asynchronous HARQ are supported. However, the uplink or UL channel is a different standard channel that uses single carrier FDMA (SC-FDMA) and as currently provided, requires a synchronous HARQ. That is, in the uplink direction, after a packet is transmitted to the eNB, an ACK/NACK (acknowledged/not acknowledged) response is transmitted by the eNB towards the UE a definite time period later, after which the UE, in case NACK was received, will retransmit the packet in UL direction in a given sub frame after a predetermined delay.

Figure 8:
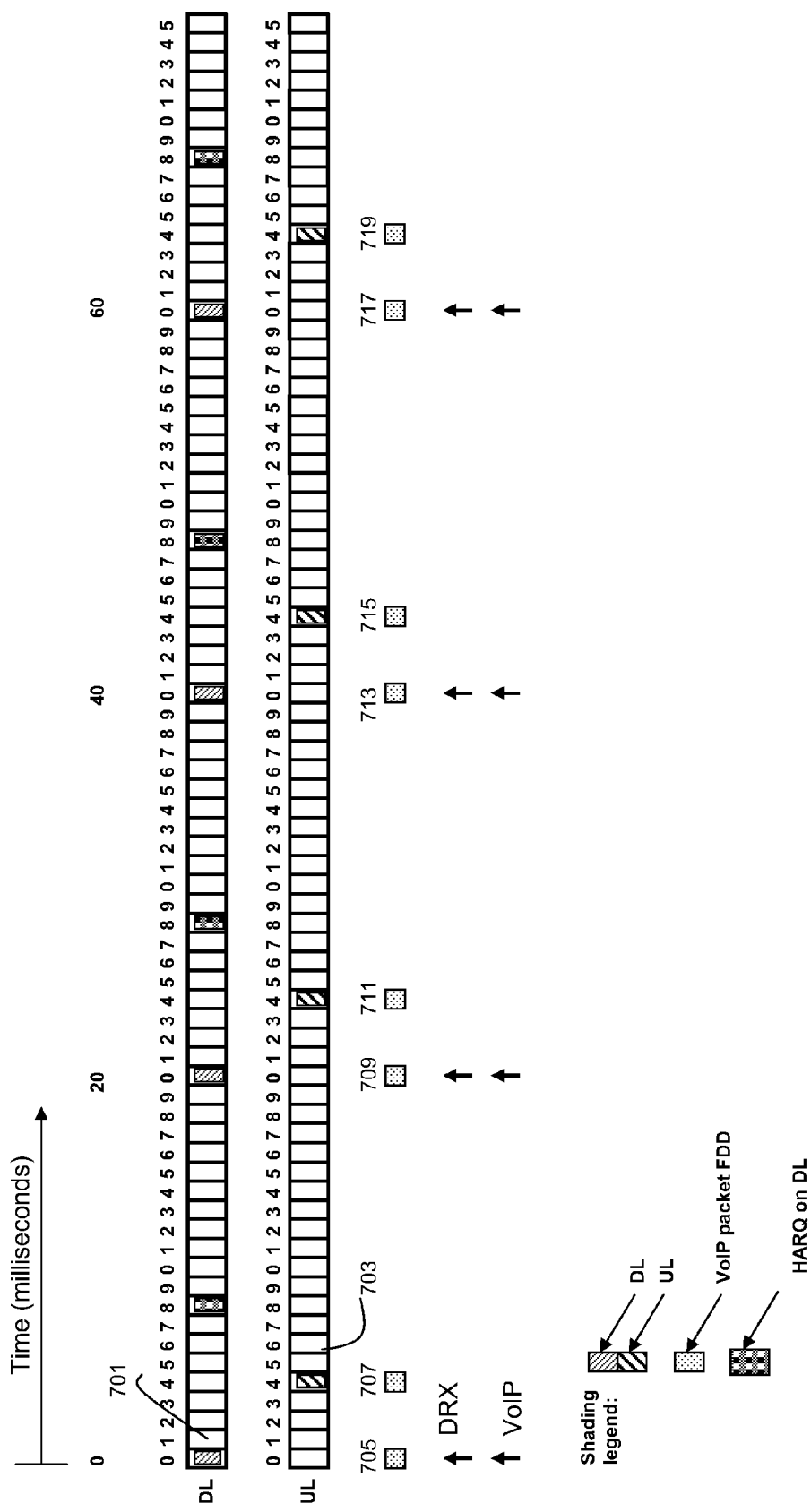
FIG. 8 illustrates a timing diagram of a full duplex communications according to an illustrative example of user equipment UE downlink and uplink communications.

FIG. 8 depicts a very simplified example frame timing diagram for a UE operating as a full duplex FDD device supporting VoIP services and DRX. In FIG. 8, timeline 701 depicts the downlink. This includes among other channels the PDCCH giving the DL resource allocations, DL direction traffic, that is, traffic directed to the UE and UL resource allocation to be used by UE for data traffic directed to the eNB. Each numbered block represents a sub frame. Ten sub frames make a radio frame. Starting at time 0, the first frame begins at sub frame 0 and proceeds up to sub frame 9. The second frame starts at time 10 (with another 10 sub frames numbered 0-9) and proceeds up to time 19. The third frame starts at time 20. This sequence continues as time increases, each sub frame is presently proposed to be 1 millisecond in length as described above. Other lengths are contemplated and possible, of course. Timeline 703 similarly depicts the sequence of frames and corresponding sub frames for the uplink of UL direction traffic, traffic from the UE directed to the e-Node B. Resource allocations for UL data traffic was given in the PDCCH in DL which resulted in these UL transmissions from the UE to the eNB.

The blocks shaded as "VoIP packets" illustrated beneath the time lines in FIG. 8, blocks numbered 705, 707, 709, 711, 713, 715, 717 and 719, represent VoIP packets. VoIP packets are used here as an example use case. It should be understood that the VoIP packets in the DL and UL are just data transmitted in the allocated resources. In this example it happens that the data is transitted with a fixed interval equal to what is used for VoIP. However, the illustrative embodiments of the invention are not limited by this simplified example and extend to many cases other than VoIP. For the full duplex devices (FDD) the HARQ requirement on the uplink UL is fairly easily understood. In FIG. 8, the cycle chosen for the DRX protocol is selected to be compatible with the frames and the VoIP cycles, in this example, DRX is 20 milliseconds. Thus at time 0, the UE receives in the DL traffic a PDCCH allocating DL resources, as well as UL resources in the same sub frame DL VoIP packets are received. At time 4, the UE transmits on the uplink shared channel "UL-SCH" the UL traffic, a response comporting with both the VoIP packet format and in this example case, the HARQ protocol. The HARQ requirements in this exemplary illustration require a UL response from the UE 4 milliseconds (also 4 sub frames) after a DL data traffic communication is received. Since the UE is full duplex FDD user equipment, it can easily transmit the uplink responses at time 0+4=4, 20+4=24, 40+4=44, and 60+4=64. Thus in this simple example, by arranging the DRX cycle to be compatible with the VoIP cycles of 20 milliseconds, the UE sees DL messages allocating resources to it each time it becomes active at the end of the DRX cycle and listens, according to the DRX rules, and the UE transmits a response on the UL 4 milliseconds later for each received DL message. The response transmitted on the UL includes the UL data (here VoIP) and the possible ACK/NACK HARQ message corresponding to the received PDCCH/VoIP packet message on the DL. The HARQ corresponding to this UE UL transmission will appear on the DL 4 milliseconds later, at time 8, then again later at time 28, 48 and 68; these HARQ DL responses are illustrated in FIG. 8.

Preferred embodiments of apparatus and methods of the present invention address the need for providing half duplex FDD UEs in the e-UTRAN environment. Unlike the full duplex UEs, a half duplex UE transceiver can only operate in a receive (e.g. DL) or transmit (UL) mode at any given sub frame. This half duplex feature eliminates the need for expensive duplex filtering in the radio transceiver device and thus makes lower cost UEs or mobile transceivers possible. However, the requirement that a DL message be responded to with the HARQ message on the UL 4 milliseconds later remains in place in the exemplary system. The HARQ response is in response to the reception of the payload data, which in the illustrative examples is a VoIP packet. Also, the HARQ timing in response to a UE UL message to the eNB will result in an ACK/NACK on the DL at a predetermined time, for example, 4 milliseconds later. Further, to avoid collisions in the transceiver at the antenna, for example, the UE needs time, at least one sub frame, to switch from DL to UL (receiving to transmitting) mode. The use of one sub frame to switch directions in the half duplex UE is one option. However, longer periods would also work and are contemplated but not further illustrated here. In a first preferred embodiment of the invention, it is proposed that the half duplex FDD UE be operated in a half duplex cycle referred to as "3+1/3+1." The half duplex cycle is continuous and repeating. In this method of providing the half duplex services, the UE will operate in receiving, or DL, mode for 3 sub frames, then a switch or guard band sub frame will be provided, followed by the UE operating in transmit or UL mode for 3 sub frames, and another switch sub frame, and this cycle will continue. The choice of 3 sub frames in each direction provides support for the required timing for performing the HARQ cycle response for the DL messages on the UL at the appropriate time and with no impact on currently defined HARQ procedures (defined for full duplex).

Figure 9:
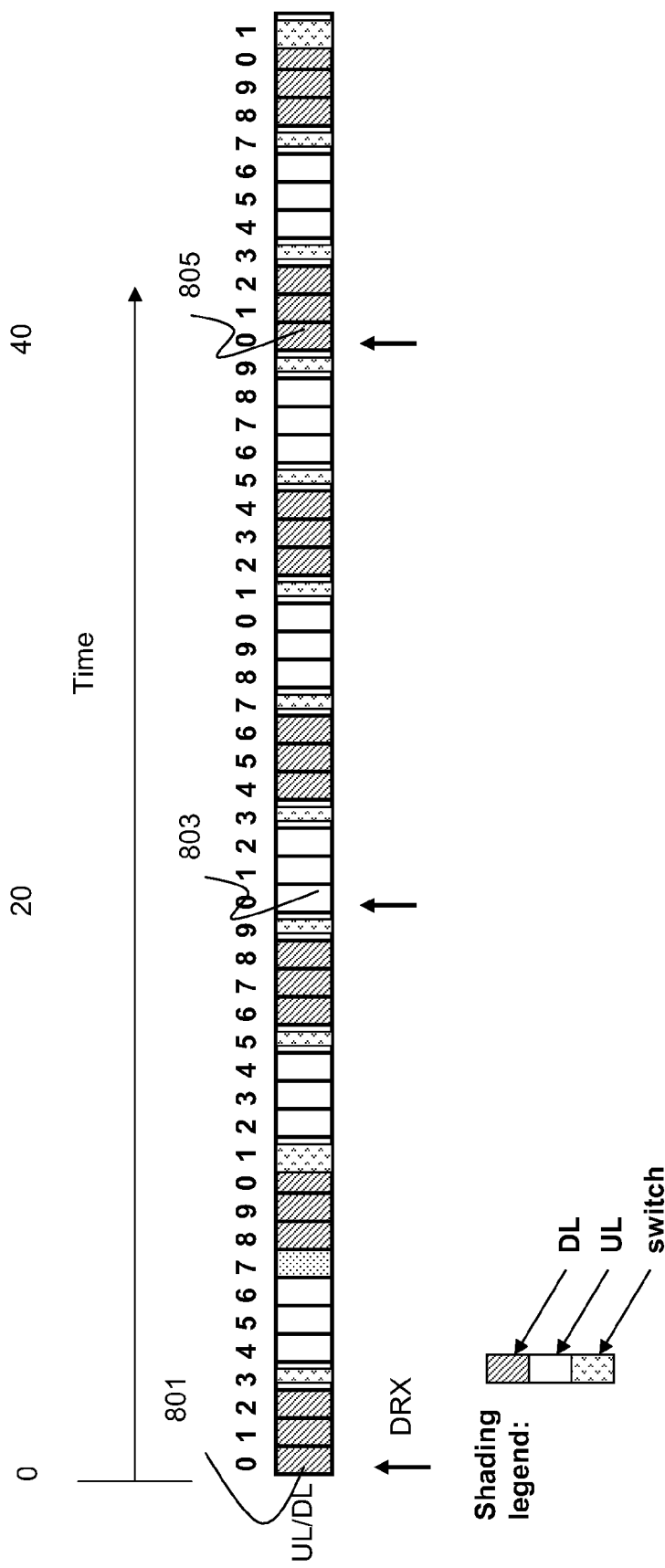
FIG. 9 illustrates a half duplex cycle with a window length according to an advantageous embodiment of the invention.

FIG. 9 illustrates, in a non-limiting example of a simple timing diagram, the sub frame and frame relationship for an illustrative embodiment of the invention for performing the half duplex cycle, "3+1/3+1" case. In FIG. 9, timeline 801 illustrates the half duplex UE operation in transitioning from receive or DL mode to transmit or UL mode, with a switch frame between each mode. At time 0, the UE is in DL mode and can receive messages on PDCCH and can determine if resources are allocated to the UE. At time 20, sub frame 803, the UE is in UL mode and cannot receive messages. At time 40, in contrast, at sub frame 805, the UE is again in DL mode and can receive PDCCH messages and determine whether any resources are allocated to the UE.

FIG. 9 illustrates in a simplified timing diagram a potential problem in providing the half duplex UE services in the e-UTRAN environment with DRX. Timeline 801 illustrates a downlink duplex window (see time 0, 1, 2 for example) of 3 sub frames, a switch of 1 sub frame, an uplink duplex window of 3 sub frames (see times 4, 5, 6 for example) and another switch sub frame, in other words the "3+1/3+1" repeating half duplex pattern. Below the timeline the up arrows indicate sub frames where a DRX cycle ends and the UE should, ideally, monitor the DL PDCCH message. At time 20, assuming the DRX cycle is again 20 milliseconds, sub frame 803 in timeline 801 indicates the UE should end a DRX standby or sleep mode and check the PDCCH message. However, the half duplex FDD UE cannot determine whether a PDCCH message is present, because the half duplex FDD UE is in transmit or UL mode at sub frame 803. In a contrasting example, when the up DRX arrow at time 40 indicates that the DRX cycle is ending, the UE is at sub frame 805, which is shaded as a receive or DL sub frame in the half duplex pattern and the UE can receive PDCCH messages for decoding at that time.

Figure 10:
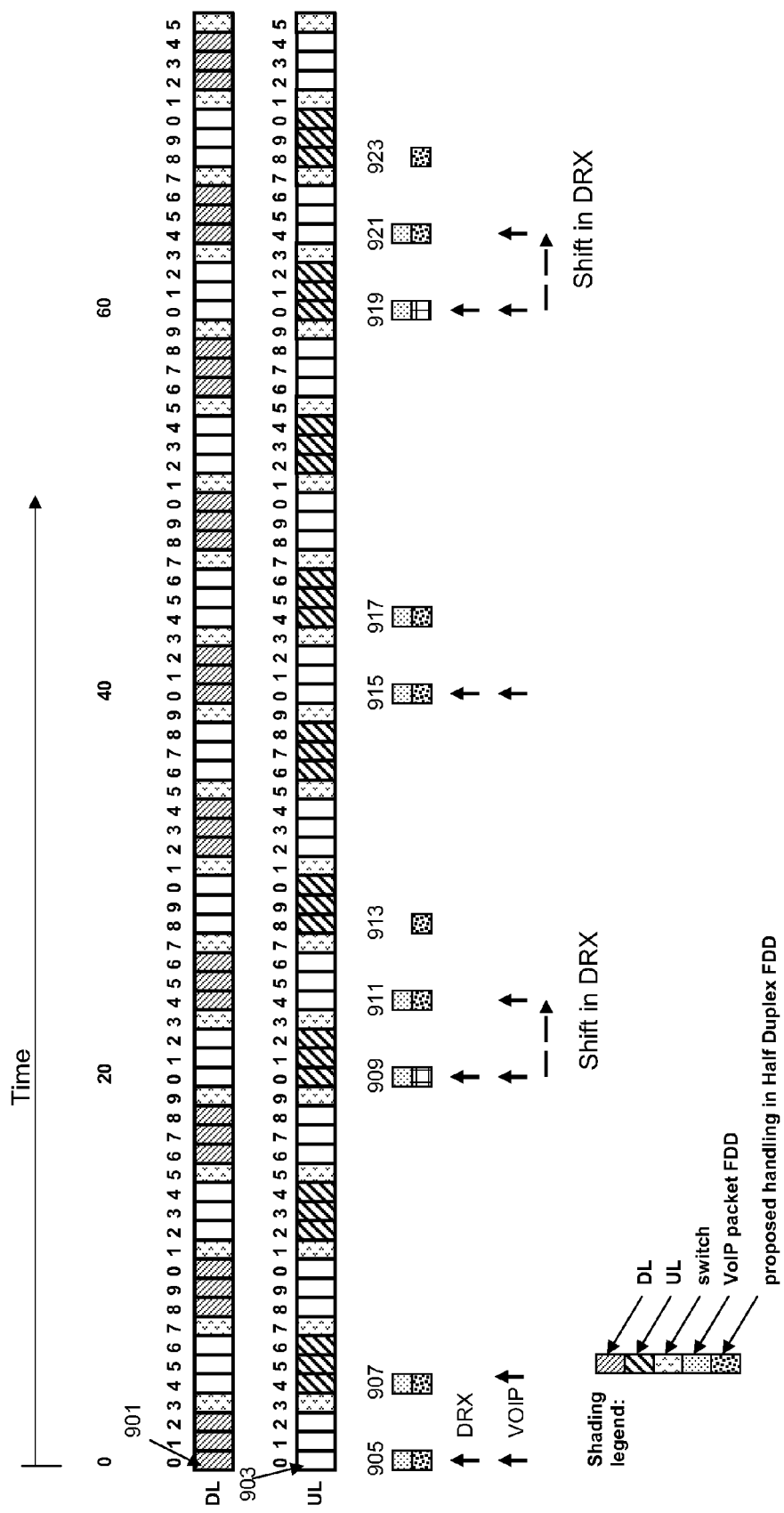
FIG. 10 illustrates a timing diagram demonstrating the advantageous use of an embodiment of the invention to provide DRX in a half duplex communications terminal.

FIG. 10 illustrates an illustrative preferred embodiment method of the present invention for providing half duplex UEs with DRX in the e-UTRAN environment. In FIG. 10, timeline 901 depicts repeating sub frames labeled 0-9 for each frame in the downlink (DL). Timeline 903 depicts repeating sub frames labeled 0-9 in the uplink (UL). For clarity, not all transactions are illustrated and the example is simplified as an explanatory case illustrating the invention. The two timelines together depict the direction the half duplex UE is in at a given point in time, for example at time 0, sub frame 0 is shaded in the DL timeline 901, indicating the UE is in the DL mode. In timeline 903, the UL timeline is not shaded at time 0, sub frame 0. At time 3, sub frame 3 is shaded in "switch" mode in both the DL and UL timelines 901, 903 as the UE changes to UL mode. At time 4, the UE is in UL mode and is able to transmit messages but not receive. The example half duplex cycle illustrated here is a pattern "3+1/3+1" with a duplex window of 3 sub frames in FIG. 10 along both the DL and UL timelines 901 and 903. The blocks beneath timeline 903 labeled 905, 907, 909, 911, 913, 915, 917, 919, 921, and 923 will now be described in details using VoIP as a non limiting use case example. Block 905, which occurs at time 0, indicates that at the end of the 20 millisecond DRX cycle, the UE receives a PDCCH including an allocation of DL and UL resources indicating a DL VoIP message is present in Block 905. Block 907, at time 4 milliseconds, illustrates that the UE is in UL mode and can transmit the required ACK/NACK information to support the HARQ service in the UL and the VoIP UL packet (corresponding to the earlier UL allocation granted the UE in the DL message on the PDCCH channel at time 0). For completion of the picture the UE receives the ACK/NACK message related to the UL data traffic in the DL 4 milliseconds later i.e. in the sub frame labeled 8, which in this case is within the DL reception window. Again, this DL traffic is not illustrated in FIG. 10, for clarity.

Blocks 909, 911, and 913 in FIG. 10 illustrate a preferred embodiment of the invention, a solution to implementing the "3+1/3+1" pattern of the half duplex UE in relation to and supporting the DRX, HARQ and VoIP services. In Block 909, the DRX cycle ends at 20 milliseconds. At this time, however, the UE is in UL or transmit mode due to the repeating half duplex cycle and cannot receive the PDCCH. According to this illustrated preferred embodiment of the present invention, a rule for DRX of half duplex devices is created. This rule for DRX provides that if the normal DRX cycle ends on a sub frame in the half duplex cycle for the UE that is a UL sub frame, the DRX is delayed by 4 milliseconds (that is, by 3+1 sub frames in this illustrative non-limiting example). In block 911 the UE then is again in DL mode and the UE can receive and examine the PDCCH channel to determine if resources are allocated, in the example illustrated here another VoIP message is received by the UE in the DL. The response required for VoIP and HARQ support is then performed also delayed at block 913, when the UE half duplex cycle is again in UL mode. Also in this case the UL ACK/NACK received by the UE in DL is received according to normal HARQ rules i.e. 4 milliseconds after transmitting the UL data. This now corresponds to a DL reception window due to the added time shift. Again, this is not illustrated in FIG. 10.

At time 40 milliseconds, at block 915, the DRX cycle again coincides with the DL sub frames in the UE. In this case, no DRX shift is required and the UE can examine the PDCCH to determine if resources for DL and UL transactions are allocated. Here again a VoIP packet is received in the DL, and 4 milliseconds later, the UL message that corresponds to the DL message (at time 40, block 915) is transmitted by the UE at time 44 milliseconds, block 917.

At time 60 milliseconds, block 919 again illustrates a potential timing conflict. The DRX cycle has again ended at a sub frame where the UE half duplex cycle is again in UL mode and cannot receive the PDCCH. The DRX cycle is then shifted, again by 4 milliseconds (3+1), to time 64 milliseconds. Block 921 then shows the UE in DL mode and ready to examine the PDCCH for both DL and UL resource allocations. Again, the corresponding HARQ and VoIP transaction in the UL is performed shifted by 4 milliseconds.

Thus a method for providing DRX in a half duplex UE in the e-UTRAN environment is that the UE operates in DL and then UL mode in a cycle of three DL sub frames, a shift sub frame, three UL sub frames, and a shift sub frame. If the DRX cycle ends on a UL sub frame, the DRX is shifted by, in one example, 3+1=4 sub frames (or 4 milliseconds.). As seen from the above explanation, the major benefit from applying this time shift to the DRX and PDCCH reception is that other procedures, such as the HARQ procedure, can work as presently envisioned in e-UTRAN without any additional changes and thereby remain unchanged compared to full duplex FDD.

The half duplex cycle of DL, switch, UL, switch, presented as "3+1/3+1" in FIG. 10 is of course only one exemplary half duplex cycle for a UE. The timing illustrated in FIG. 10 may be considered an example of a half duplex UE with window length "3." The half duplex cycle can of course be extended to other window lengths. Also, the use of the same window length "3" in the DL and the UL sub frames is only one illustrative embodiment of the invention, the window lengths also may have different lengths in the DL and UL sub frames, these variations are also contemplated as further embodiments of the invention.

Figure 11:
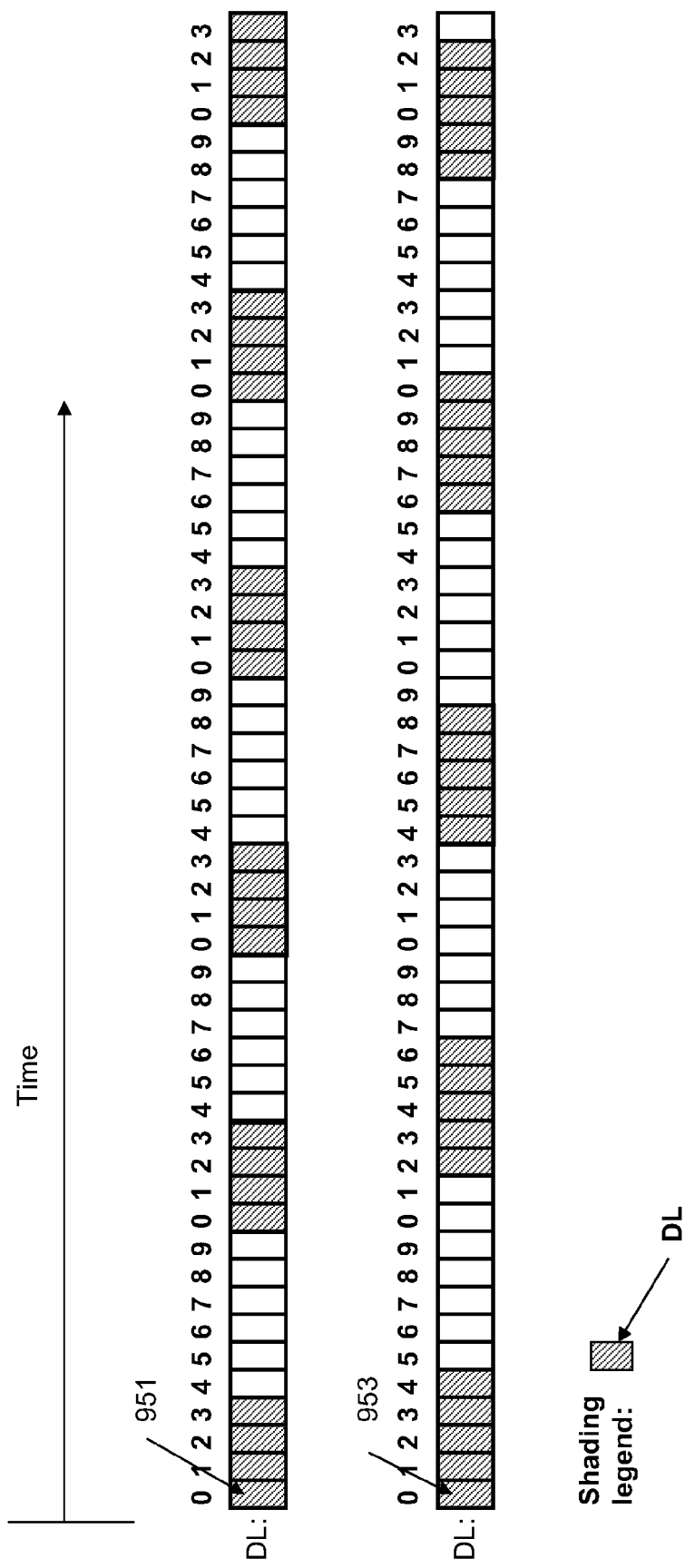
FIG. 11 illustrates timing diagrams presenting the advantageous use of alternative half duplex cycles as additional embodiments of the invention.

FIG. 11 depicts two alternative preferred embodiments for half duplex cycles having DL and UL window lengths "4" in timeline 951, and "5" in timeline 953. In timeline 951, the pattern would be 4 DL sub frames, a switch sub frame, and 4 UL sub frames, and a switch sub frame. Timeline 953 presents another preferred embodiment of a half duplex cycle FDD UE with window length "5," the cycle illustrates a pattern of 5 DL sub frames, a switch sub frame, 5 UL sub frames, a switch sub frame, again repeating, thus another embodiment of the half duplex cycle is presented. Again, in these simple illustrative examples, the DL window length M and the UL window length N are simply set to the same values. Alternative embodiments are contemplated where the length M for the DL and the length N for the UL are different values.

One illustrative embodiment of the DRX shift for a "3+1/3+1" cycle can be expressed as an "if-then" relation:
 IF DRX active sub Frame Number MODULO ((3+1)*2) is NOT<3, then Shift DRX sub Frame Number by adding 4

The MOD or modulo function, as is known to those skilled in the art, will return the integer remainder of a ratio of two integers. Thus if the current sub frame number=0, 0/8=0, and remainder is 0, testing the inequality 0 is less than 3, so this sub frame is a DL sub frame. Similarly, if the current sub frame number is 8, then again the function 8 MOD 8 returns 0, this sub frame is also a DL sub frame in the half duplex cycle. The sub frame 4, as seen in the figures for the "3+1/3+1" examples illustrated above, is evaluated as 4 MOD 8 and returns 4 as the result, testing the inequality 4 is not less than 3, and so this is not a DL sub frame. Thus if the normal DRX cycle ended here, in this illustrative embodiment of the invention, DRX must be shifted (delayed) by adding 4. In this illustrative embodiment, the half duplex cycle of DL sub frames, switch, UL sub frames and switch is arranged with the DRX so that the end of a DRX cycle does not coincide with a "switch" sub frame as is further described below.

In FIG. 10 sub frame 20 (at time 20 milliseconds) is of particular interest. As the DRX cycle is 20 milliseconds in this non-limiting example, the DRX cycle ends at sub frame 20. Using the rule above, 20 MOD 8 returns 4, (the integer division 20/8=2 remainder 4). Again this remainder is not <3, the inequality is false, and the sub frame is not a DL sub frame in the half duplex cycle; the illustrative embodiment of the invention then shifts the DRX by 4.

The exemplary cases described so far and the DRX cycles illustrated in FIG. 10 are such that the DRX cycle ends in either a DL sub frame, or an UL sub frame, in the duplex cycle. Another possibility is that the DRX cycle could be allocated relative to the duplex cycle such that the DRX active sub frame ends on a "switch" sub frame in the "3+⅓+1" cycle. In this case the UE cannot perform any action (as adding 4 would only cause the same problem to occur) so in another illustrative embodiment, the proposed DRX rule is stated this way: If the DRX cycle ends in an UL sub frame in the UE half duplex cycle, the UE will shift the DRX by 3+1 to place it in a DL sub frame. If the DRX cycle ends in a "switch" sub frame the UE will take no action. In this illustrative embodiment, the base station or eNB is responsible to assure the DRX cycle does not end in a "switch" sub frame in the half duplex cycle.

In another workable, although less preferred, illustrative embodiment, where the DRX and half duplex cycle are arranged such that the end of a DRX cycle could in fact coincide with a "switch" sub frame, the UE could add a small delay, such as 1, to the DRX period, and then again evaluate the sub frame to determine if it is an UL sub frame. This illustrative embodiment requires slightly more complexity in the UE than the above approach, and in many cases, is not necessary.

As seen in FIG. 10, with the 3+1/3+1 half duplex cycle, the DRX cycle of 20 milliseconds, the DRX cycles will end on sub frames at time 0, 20, 40 60, 80, 100 etc. The "switch" sub frames begin at time 3, and then 4 is added to each, so sub frames at time 3, 7, 11, 15, 19, 23, 27, 31, 35, 39, 43, 47, 51, 55, 59, 63, 67, 71, 75, 79, 83, 87, 91, 95, 99 are also "switch" sub frames. Thus in the particular non-limiting embodiment illustrated in FIG. 10, the DRX cycle never ends on a "switch" sub frame in the half duplex UE cycle. In the illustrative embodiments of the present invention, the e-Node B should configure the DRX cycle with the knowledge of the half duplex cycle in the UE, in order to ensure this is the case for any other duplex window length.

A general rule can then be developed for half duplex cycles with different symmetric window lengths:

If DRX Sub frame Number MOD ((X+1)*2) is NOT<X then shift DRX by (X+1), (where X is the window length for both downlink and uplink windows)

Stated another way: if the usual DRX cycle ends on a UL sub frame in the half duplex cycle for the UE, delay (that is, shift) DRX by X+1 sub frames. "X", the integer indicating the number of sub frames in the duplex window, can be any integer of 1 or more sub frames.

The illustrative embodiments thus provide a half duplex UE with DRX implemented and without major modification to the DRX decision algorithm in the eNB base station compared to the full duplex UEs in the environment. However, some further considerations also must be taken into account. The "on duration" and "inactivity" timers are generally configured for a full duplex FDD UE. For the half duplex UE functionality supported by the illustrative embodiments of the invention, the changes made in the DRX cycle must also be evaluated to determine how to manage these supporting timers for the half duplex UE.

For the "on duration" case, there are several approaches contemplated as preferred embodiments for implementing the half-duplex UE with DRX. Comparing to the full duplex FDD with DRX, the "on duration" time determines how many sub frames the UE will remain active following the end of a DRX sleep or standby cycle. By setting the on duration to a number of sub frames (or, equivalently, a number of milliseconds), the system determines a number of cycles the UE is to remain active and monitoring the DL at the end of a DRX standby or sleep cycle. However, in the half duplex case, taking for example the "3+1/3+1" cycle embodiment discussed in detail above, the "on duration" time may extend past the DL window.

Several alternative approaches to the on duration timing are contemplated as preferred embodiments of the present invention. In a first illustrative embodiment, a rule can be placed on the system that the "on duration" is limited to the total number of sub frames in the DL duplex window. So, for the embodiment described in detail above with a symmetric downlink and uplink duplex window of "3," the on duration would be limited to 3 milliseconds or equivalently, 3 sub frames.

In an alternative illustrative embodiment, the "on duration" timing can be modified for the half duplex UE so that the on duration extends to the next half duplex DL window if, otherwise, the DL window will end prior to the end of the on duration time. Thus, if the on duration were 6, in the embodiment described above with the "3+1/3+1" timing, the UE would be active in the present DL duplex window and also, in the next DL duplex window that occurs in the half-duplex UE cycle.

Thus for an illustrative case, if the on duration were 10 sub frames and the duplex window length were again "3" for both DL and UL duplex windows, the on duration would extend over 3 complete DL cycles, and would keep the UE active for the first DL sub frame in the next DL window.

Another illustrative embodiment for the "on duration" approach of the present invention is to limit the "on duration" to be less than or equal to the DL duplex window length. This approach is less preferred as it will limit the system choices, but is feasible.

The "inactivity timer" function must also be considered. In the full duplex UE, the "inactivity timer" is a timer that is reset for the UE each time a PDCCH with resources allocated to the UE is detected in the DL. Thus if the inactivity timer were 6, and a PDCCH were decoded with resources allocated to the UE, the UE would remain active for the next 6 sub frames and monitor the DL for another PDCCH. If another PDCCH were received that allocated resources to the UE before the inactivity timer completely times out, the timer would be reset and again decremented until the timer reached zero. The UE would remain active in this example even if the "on duration" time was completed.

Again in order to support the half duplex UE, an illustrative embodiment modifying the operation of the inactivity timer in the half duplex UE is contemplated. Because the inactivity timer may be longer than the DL window, the timer is carried across the switch sub frame and the UL window of the half duplex cycle, and is again used in the next DL window. The inactivity timer is extended across the UL window and the switch sub frames to the next DL window, and is decremented in each DL window until either the timer reaches zero, or the DL window closes. In that case, the inactivity timer will again be extended until the next DL window for the half duplex UE. In this manner, the UE will continue to monitor the DL for the number of DL sub frames indicated by the inactivity timer, and the inactivity time is extended across DL windows in the half duplex UE.

Figure 12A:
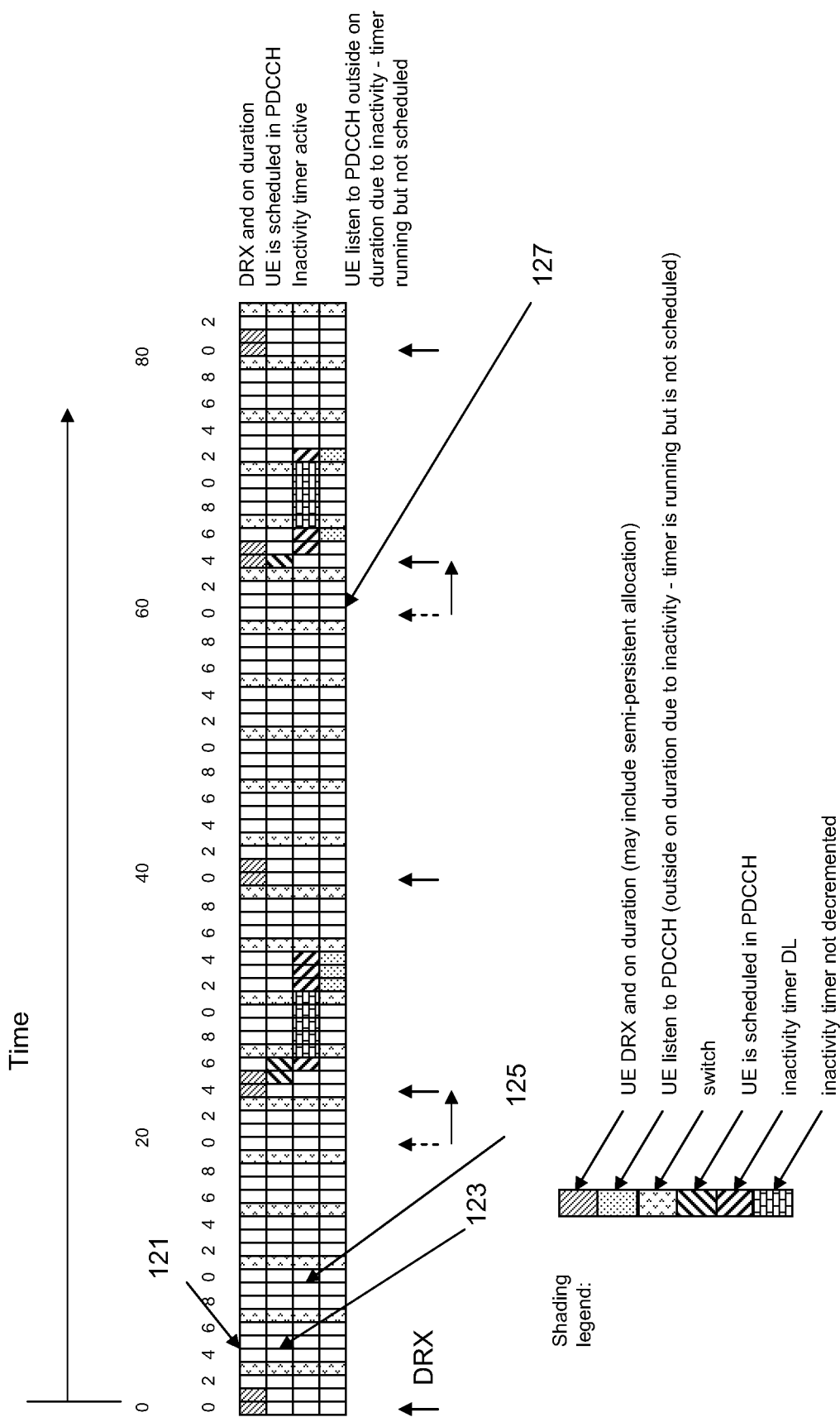
FIGS. 12a and 12b illustrate timing diagrams presenting the advantageous use of the half duplex cycles of the invention with DRX and inactivity and on duration timers.
Figure 12B:
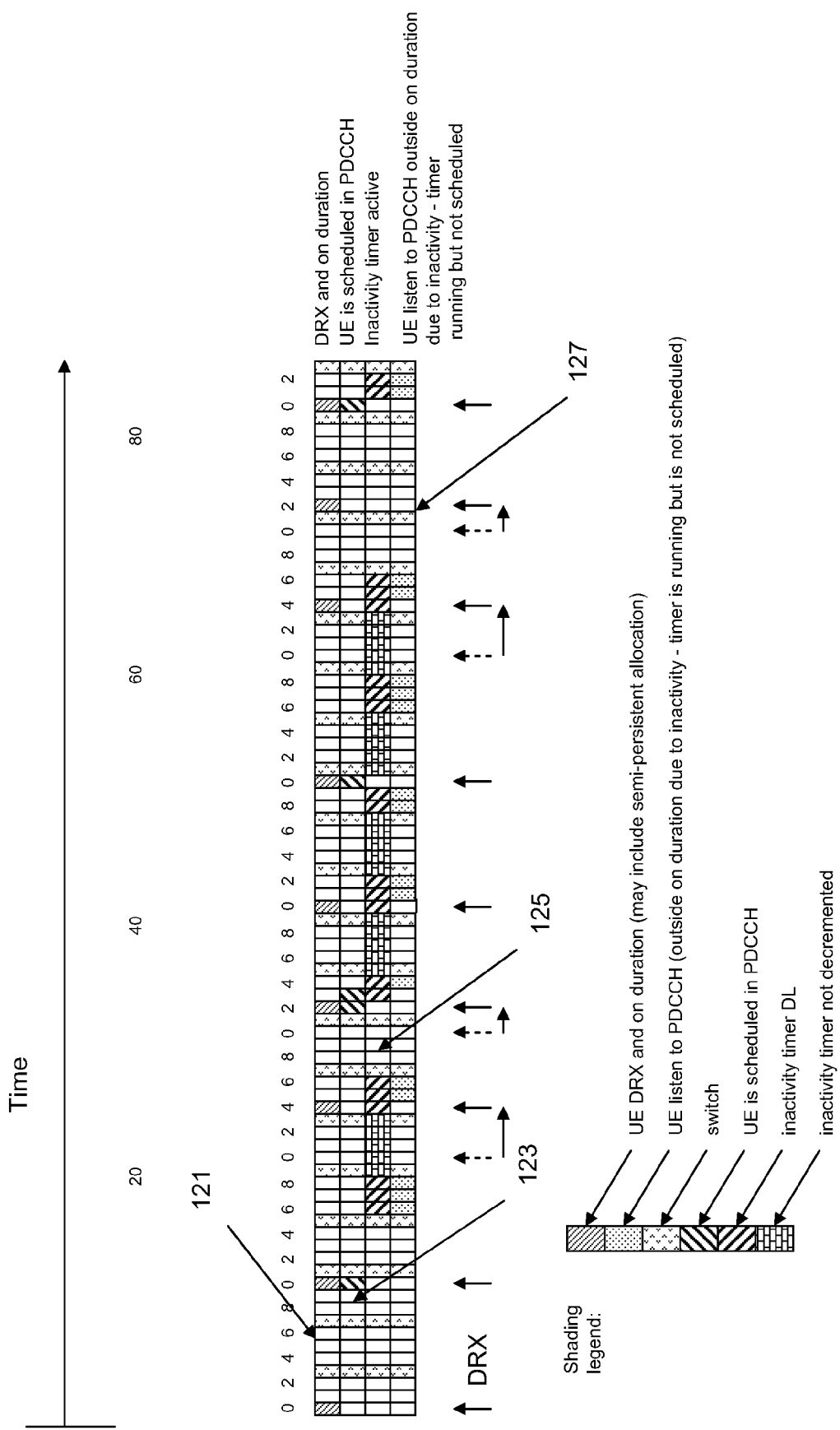

FIGS. 12a and 12b depict timing diagrams of illustrative embodiments of the half duplex cycle with example illustrative embodiments of on duration and inactivity timers shown. In FIG. 12a, a case of a "3+1/3+1" half duplex cycle with DL window "M" equal to "3" is depicted for 83 sub frames and in this illustrative embodiment, UL window "N" is also equal to "3". A DRX of cycle of 20 milliseconds is depicted, with on duration of 2, and inactivity timer 3. Row 121 illustrates sub frames where the DRX cycle is ending, the UE is monitoring the DL for the 2 sub frames of the DRX cycle, and at times 20 and 60, row 121 also illustrates that the DRX cycle is shifted according to the rules described above, as the UE cannot monitor the DL in an UL sub frame of the "3+1/3+1" half duplex cycle. Row 123, the second row in the table, illustrates frames where the UE also detects during a DL sub frame PDCCH messages that allocate resources to it (i.e. UE is addressed), thereby starting the inactivity timer. Row 125 illustrates sub frames where the inactivity timer is active following a PDCCH decode sub frame that allocates resources to the UE, for example see the sub frame at time 26. In this example, the inactivity timer is set to 3 at time 25 (but the first inactivity sub frame begins at time 26), because UE is addressed in PDCCH at time 25 (see time 25 in row 123). UE is scheduled again at time 26 (see time 26 in row 123), so the inactivity timer is reset to 3 at time 26, but cannot be decremented in a DL sub frame for the UE until time 32, so the inactivity timer is extended across an UL sub frame cycle and the two "switch" sub frames, and the UE will remain active throughout the period.

In FIG. 12a, row 127 illustrates sub frames which the UE will monitor but is not addressed, i.e. where the UE will monitor the PDCCH for resource allocation beyond the on duration time from the last DRX cycle due to the fact the inactivity timer is still running. For example, see row 127 at time 32, 33, 34 and again at time 66 and time 72.

FIG. 12b depicts another illustrative embodiment timing for the half duplex UE with DRX. In this illustrative embodiment, the UE has a duplex cycle of "3+1/3+1" with a duplex window of length 3, the on duration is set to 1, and the inactivity timer is set to 6. Importantly, the DRX cycle in this illustrative embodiment is set to 10. Again, row 121 illustrates shaded sub frames where the half duplex UE is in DL sub frames and the DRX cycle causes the UE to become active; for example at time 0. The on duration is now only 1 sub frame so only one sub frame is illustrated as shaded for time 0, also time 10. At time 20 again the UE is in UL half duplex cycle sub frames when the DRX cycle ends and the shift by four frames occurs.

An alternative presenting another illustrative embodiment approach to the DRX shift is also depicted in FIG. 12b. At time 30 the UE is again in UL sub frames when the DRX cycle ends and again the DRX shift occurs. In this example the DRX shift is not a fixed amount but shifts to the next DL window. Thus the UE could, instead of incrementing by a fixed number of sub frames, increment the DRX cycle by an amount of sub frames (or equivalently, time) to end the DRX standby cycle in a DL sub frame. DRX shifts also occur at time 60 and 70.

Again, row 123 illustrates sub frames where the UE is monitoring DL, and decodes allocations in the PDCCH for the UE. Row 125 shows the inactivity timer, here set to 6 when the PDCCH has allocation for the UE, for example at time 33 (actually it has been set to 6 once at time 32 due to the allocation for the UE at time 32, and it is reset to 6 again at time 33 because of another PDCCH allocation at time 33), and decremented for the next 6 DL sub frames (beginning from time 34), since 6 is greater than the DL duplex window length of 3, the inactivity timer is extended across the next half duplex "shift," UL and "shift" sub frames again. Finally row 127 again illustrates those DL sub frames where the UE remains actively monitoring PDCCH beyond the on duration time due to the inactivity timer remaining active.

Figure 13:
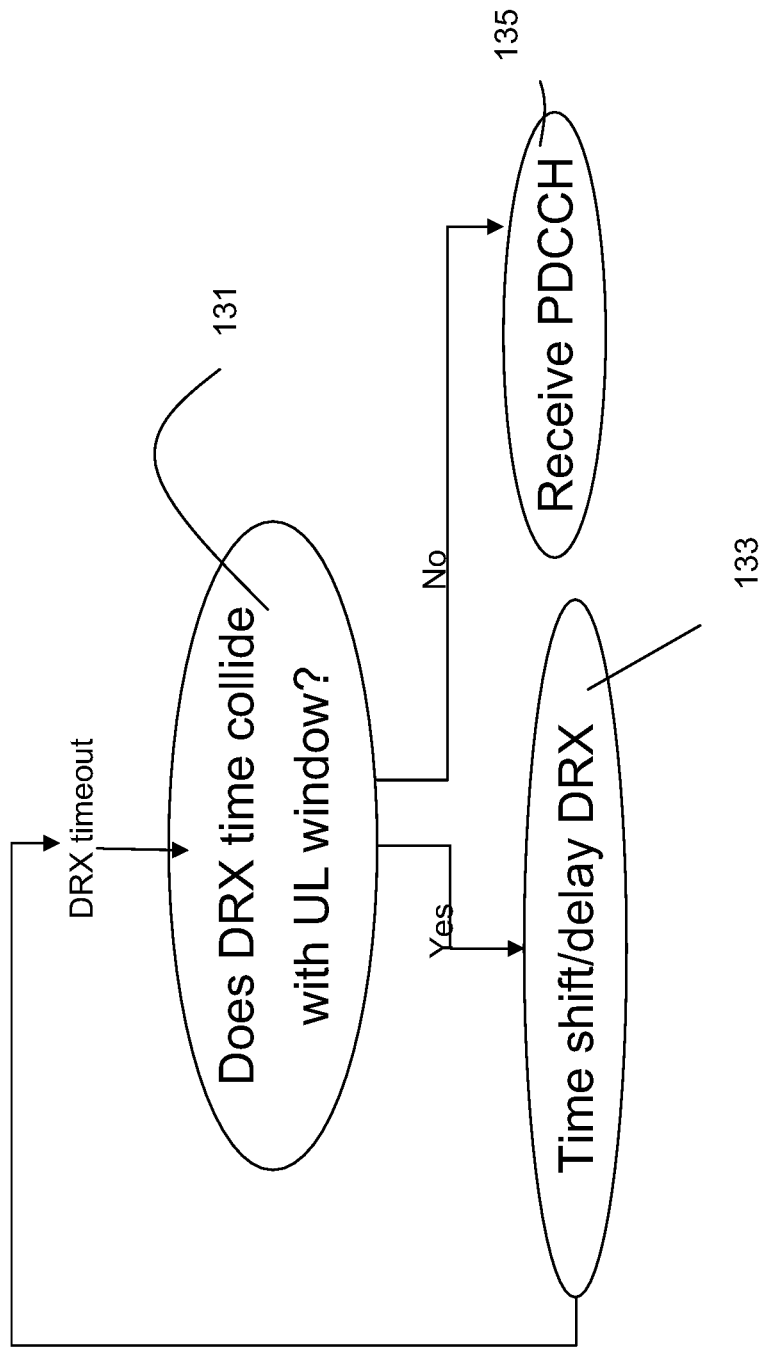
FIG. 13 illustrates a state diagram for providing state transitions to implement embodiments of the invention.

FIG. 13 illustrates a state diagram for the UE DRX shifting of the illustrative embodiments supporting a half duplex FDD UE described above. In FIG. 13, the additional states required in a half duplex FDD UE to utilize the illustrated embodiments are shown in a simple diagram. Many other states required to perform the functions of a UE are also required but only the new functions and states needed to perform the DRX shift in the half duplex FDD UE are shown. State 131 is entered following the end of a DRX sleep or standby cycle. A decision is made, for example in accordance with the rules described above, the UE determines whether the time is a UL sub frame in the half duplex cycle pattern. If the sub frame at the DRX timeout time is a UL sub frame, the state transition is to state 133, where the time shift or delay of the DRX is performed. If instead the DRX timeout coincides with a DL sub frame in the half duplex cycle pattern, the state transitions to state 135 where the UE receives messages on the PDCCH channel and determines whether the PDCCH allocates resources to this UE as described above.

The use of the states of FIG. 13 is one illustrative embodiment and is not intended to limit the invention. The state transitions shown could be implemented as software, firmware, or hardware and may be added to existing states. The UE may have a state machine, or more likely a processor that implements the states. The modifications to the inactivity timer and the on duration timer needed to extend them across the half duplex DL windows could likewise be made as changes or additions to software, hardware or firmware for a UE.

Figure 14:
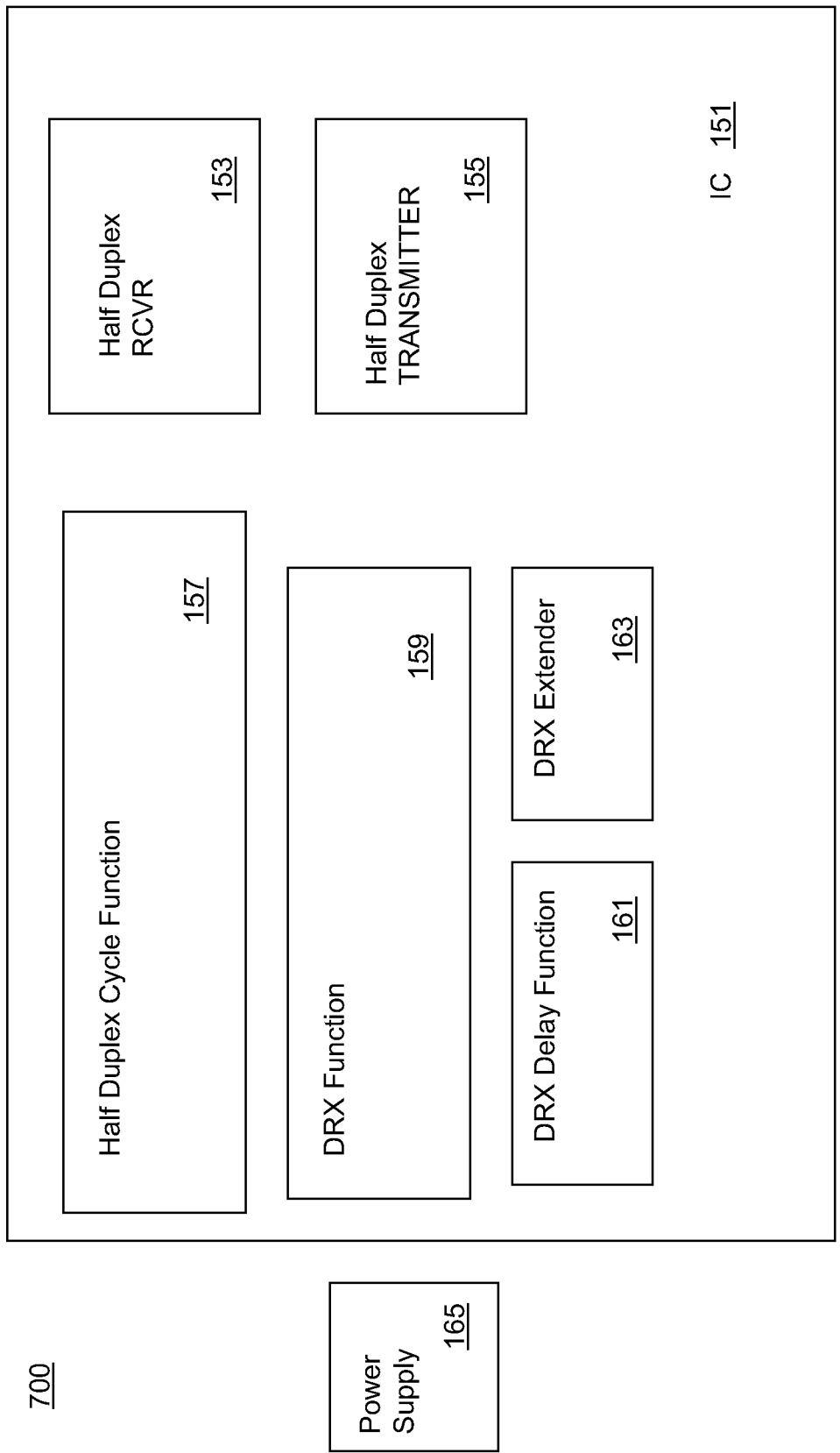
FIG. 14 illustrates an integrated circuit for providing functions implementing portions of the embodiments of the invention.

FIG. 14 illustrates a simplified block diagram for an integrated circuit ("IC") implementing the features of the half duplex UE described above. In FIG. 14, a power supply 165 is provided and supplies power to IC 151. In an illustrative embodiment the power supply 165 may be rechargeable batteries providing DC power, for example, lithium ion, nickel cadmium, or other similar batteries. Single-use batteries may also be used.

IC 151 may be implemented as a fixed hardware device or a programmable device such as a DSP or microprocessor, for example. The blocks shown within IC 151 and described above may be logic circuitry, or functionality provided by programming a microprocessor, DSP or controller to perform the functions. In IC 151, half duplex receiver 153 and half duplex transmitter 155 are coupled to an antenna terminal. The half duplex receiver 153 will not be operating in any sub frame when transmitter 155 is operating; a feature that eliminates the need for some complex and expensive full duplex filtering that is needed in full duplex devices. Half duplex cycle function 157 performs the DL receive, shift, UL transmit, shift cycles as described above, for example, a "3+1/3+1" cycle. DRX function 159 performs a sleep or standby function that periodically reduces the power consumed in the IC 151 as described above. DRX delay function 161 determines, at the end of a DRX cycle, whether the current half cycle sub frame is a DL sub frame. DRX extender function 163 extends the current DRX cycle when the DRX cycle ends in an UL sub frame as described above.

Although in the illustrative embodiment of FIG. 14, the IC 151 is shown as a single integrated circuit device, the functions may be provided in devices with different partitions, for example the transmitter and receiver could be provided in an "analog front end" IC and the remaining DRX and half cycle functions could be implemented in another IC. Other arrangements are also contemplated.

Several illustrative embodiments for the half duplex cycle are described above, the "3+1/3+1" embodiment, the "4+1/4+1" embodiment, the "5+1/5+1" embodiment and the general case embodiment. Those skilled in the art will recognize that the presently proposed relationships between the UL, DL and HARQ features of e-UTRAN make the "3+1/3+1" embodiments the preferred approach if the e-UTRAN features remain in place. However if they are modified, another half duplex UE cycle with longer or shorter duplex window lengths may become preferred. Further, additional embodiments of the invention contemplate asymmetric DL and UL window lengths, that is the length of the DL window M may not be equal to the length of the UL window N. All of these variations of duplex window length are considered to be illustrative embodiments of the invention and are contemplated as part of the invention and covered by the appended claims.

If another duplex window length is chosen, however, other than the "3+1/3+1" cycle, additional modifications will be needed in the synchronous HARQ and VoIP protocols, for example.

Embodiments of the present invention advantageously provide a half duplex UE function including DRX featuring flexible on duration and inactivity timing, HARQ, VoIP support, and the methods and embodiments of the present invention advantageously require no modification of the services and protocols presently contemplated for e-UTRAN eNB devices, MME or gateway devices, or the full duplex FDD UE devices already proposed.

Embodiments of the present invention provide solutions to providing half duplex FDD devices (HDD) such as UEs in the environment with services and timing that continues to support DRX and the synchronous HARQ cycles in e-UTRAN while having a minimum impact on the services and functionality required to implement an e-Node B base station and with no impact on the MME. Applications such as VoIP packet signaling are also supported by the half duplex UE. The preferred embodiments of the present invention as presented herein address how to provide the existing services and also support HDD devices in the same environment with the full duplex FDD UE devices at a minimum cost and with as little wasted system bandwidth as possible.

What is claimed is:

1. A method, comprising:
selectively receiving packets in a half duplex transceiver from a downlink in a downlink window having a predetermined number M of downlink sub frames;
shifting to a transmit mode in a sub frame;
selectively transmitting packets from the half duplex transceiver on an uplink in an uplink window having a predetermined number N of sub frames;
shifting to a receive mode in a sub frame;
repeating the selectively receiving, shifting to a transmit mode, selectively transmitting, shifting, in a continuous cycle of sub frames and frames comprised of multiple sub frames;
entering a discontinuous reception mode where power is conserved by reducing power to the transceiver for a predetermined number of discontinuous reception sub frames;
detecting an end to the predetermined number of discontinuous reception sub frames;
determining whether the present time coincides with an uplink sub frame;
if the determining is negative, exiting the discontinuous reception mode and receiving a packet data control channel message; and
if the determining is positive, remaining in the discontinuous reception mode for an additional M+1 sub frames and then exiting the discontinuous reception mode in a downlink sub frame and receiving a packet data control channel message.

2. The method of claim 1 and further comprising,
at the end of the discontinuous reception mode:
setting an on duration timer to a predetermined number of sub frames;
determining if the next sub frame is within a downlink window;
responsive to a positive determining, selectively decrementing the on duration timer and receiving another sub frame from the downlink; and
repeating the determining and decrementing to the end of the downlink window.

3. The method of claim 2 and further comprising:
responsive to a negative determining, maintaining the on duration timer.

4. The method of claim 3 and further comprising:
determining within a downlink window that the on duration timer is complete; and
returning to the discontinuous reception mode and reducing power to the transceiver circuit until the predetermined number of sub frames has elapsed.

5. The method of claim 1 and further comprising:
detecting a resource allocation in the packet data control channel;
setting an inactivity timer; and
determining whether the next sub frame is within the downlink window;
if the determining is positive, decrementing the inactivity timer and receiving packets on the downlink; and
repeating the determining and if the determining is positive, decrementing until the end of the downlink window.

6. The method of claim 5 and further comprising:
if the determining is negative, detecting whether the inactivity timer has expired; and
if the inactivity timer has not expired, remaining active until the next downlink window in the cycle.

7. The method of claim 1, wherein M and N is each an integer greater than or equal to 1.

8. The method of claim 1, wherein M and N are equal.

9. The method of claim 1, wherein M and N are equal integers and equal to 3.

10. The method of claim 9, wherein determining whether at the present time the sub frame is an uplink sub frame comprises determining the remainder of the modulo operation on the ratio of the present sub frame number and the integer ((3+1)*2).

11. The method of claim 10, wherein if the remainder is not less than 3, the sub frame is an uplink sub frame.

12. The method of claim 7, wherein M and N are equal integers and determining whether at the present time the sub frame is an uplink sub frame comprises determining the remainder of the modulo operation on the ratio of the present sub frame number and the integer ((M+1)*2).

13. An apparatus, comprising:
a half duplex receiver for selectively receiving radio frequency downlink signals on a downlink during a number of downlink sub frames M;
a half duplex transmitter for selectively transmitting radio frequency uplink signals on an uplink during N UL sub frames;
a discontinuous reception function for periodically reducing power to the half duplex receiver and half duplex transmitter for a predetermined number of discontinuous reception sub frames;
a half duplex cycle function for performing a predetermined half duplex cycle in the half duplex receiver and in the half duplex transmitter selectively receiving a number of sub frames M from the downlink, shifting to a transmit mode, selectively transmitting a number of sub frames N on the uplink, shifting to a receive mode, and continuously repeating the receiving, shifting to a transmit mode, transmitting and shifting to a receive mode;
a discontinuous reception delay function for determining, at the end of the discontinuous reception sub frames, if the half duplex receiver is presently receiving downlink sub frames; and
a discontinuous reception extender function coupled to the discontinuous reception delay function for, when determining the receiver is not presently receiving downlink sub frames, extending the discontinuous reception sub frames by a predetermined number of sub frames until the receiver is receiving downlink sub frames.

14. The apparatus of claim 13, wherein the discontinuous reception delay function further comprises circuitry for performing an algorithm for determining whether the present sub frame is a downlink sub frame performing a modulo operation on the sub frame number and the quantity ($(M+1)*2$), and then evaluating the remainder to determine if the remainder is less than M, and M and N are equal integers.

15. The apparatus of claim 13 and further comprising:
a packet data control channel receiver for receiving PDCCH signals on the downlink and for detecting when resources are allocated by the PDCCH; and
a packet data control channel handler for managing downlink and uplink signals in later sub frames responsive to the PDCCH receiver.

16. The apparatus of claim 15, and further comprising:
an on duration timing function for keeping the half duplex receiver active for a number of on duration sub frames following the end of a discontinuous reception sub frame period.

17. The apparatus of claim 15, and further comprising:
an inactivity timing function for keeping the half duplex receiver active for a number of inactivity sub frames following receiving a packet data control channel signal allocating resources.

18. The apparatus of claim 17, wherein the inactivity timing function enables the discontinuous reception at the end of the inactivity sub frames.

19. A system comprising:
one or more base stations for sending and receiving radio frequency signals;
one or more full duplex user equipment radio frequency transceivers selectively connected to at least one of the base stations;
at least one half duplex user equipment radio frequency transceiver selectively connected to at least one of the base stations, each half duplex user equipment radio frequency transceiver further comprising:
a half duplex receiver for selectively receiving radio frequency downlink signals on a downlink during a number of downlink sub frames M;
a half duplex transmitter for selectively transmitting radio frequency uplink signals on an uplink during N uplink sub frames;
a discontinuous reception function for periodically reducing power to the half duplex receiver and half duplex transmitter for a predetermined number of discontinuous reception sub frames;
a half duplex cycle function for performing a predetermined half duplex cycle in the half duplex receiver and in the half duplex transmitter selectively receiving a number of sub frames M from the DL, shifting to a transmit mode, selectively transmitting a number of sub frames N on the uplink, shifting to a receive mode, and continuously repeating the receiving, shifting to a transmit mode, transmitting and shifting to a receive mode;
a discontinuous reception delay function for determining, at the end of the discontinuous reception sub frames, if the half duplex receiver is presently receiving DL sub frames; and
a discontinuous reception extender function coupled to the discontinuous reception delay function for, when determining the receiver is not presently receiving downlink sub frames, extending the discontinuous reception sub frames by a predetermined number of sub frames until the receiver is receiving downlink sub frames.

20. An apparatus comprising:
one or more processors; and
one or memories storing computer program code,
wherein the one or more memories storing the computer program code are configured, with the one or more processors, to cause the apparatus to at least:
cause periodic reduction of power to a half duplex receiver and a half duplex transmitter for a predetermined number of discontinuous reception sub frames, wherein the half duplex receiver is configured to selectively receive radio frequency downlink signals on a downlink during a number of downlink sub frames M, and wherein the half duplex transmitter is configured to selectively transmit radio frequency uplink signals in an uplink during N uplink sub frames;
cause performance of a predetermined half duplex cycle in the half duplex receiver and in the half duplex transmitter, wherein the cycle comprises selectively receiving a number of sub frames M from the downlink, shifting to a transmit node, selectively transmitting a number of sub frames N on the uplink, and continuously repeating the receiving, shifting to a transmit mode, transmitting, and shifting to a receive mode;
determine, at the end of the discontinuous reception sub frames, if the half duplex receiver is currently receiving downlink sub frames; and
in response to determining that the half duplex receiver is not presently receiving downlink sub frames, extending the discontinuous reception sub frames by a predetermined number of sub frames until the half duplex receiver is receiving downlink sub frames.

* * * * *

UNITED STATES PATENT AND TRADEMARK OFFICE
CERTIFICATE OF CORRECTION

| | | |
|---|---|---|
| PATENT NO. | : 8,571,091 B2 | |
| APPLICATION NO. | : 12/811624 | |
| DATED | : October 29, 2013 | |
| INVENTOR(S) | : Lars Dalsgaard et al. | |

It is certified that error appears in the above-identified patent and that said Letters Patent is hereby corrected as shown below:

In the Claims:

In Claim 20:
Column 24, line 20, "or memories" should be deleted and --or more memories-- should be inserted.

Column 24, line 37, "node" should be deleted and --mode-- should be inserted.

Signed and Sealed this
Seventh Day of January, 2014

Margaret A. Focarino
*Commissioner for Patents of the United States Patent and Trademark Office*